(12) United States Patent
Pahud et al.

(10) Patent No.: US 11,068,111 B2
(45) Date of Patent: *Jul. 20, 2021

(54) HOVER-BASED USER-INTERACTIONS WITH VIRTUAL OBJECTS WITHIN IMMERSIVE ENVIRONMENTS

(71) Applicant: MICROSOFT TECHNOLOGY LICENSING, LLC, Redmond, WA (US)

(72) Inventors: Michel Pahud, Kirkland, WA (US); Nathalie Riche, Issaquah, WA (US); Eyal Ofek, Redmond, WA (US); Christophe Hurter, Toulouse (FR); Sasa Junuzovic, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/695,771

(22) Filed: Nov. 26, 2019

(65) Prior Publication Data

US 2020/0097119 A1 Mar. 26, 2020

Related U.S. Application Data

(63) Continuation of application No. 15/624,097, filed on Jun. 15, 2017, now Pat. No. 10,514,801.

(51) Int. Cl.
*G06F 3/044* (2006.01)
*G06F 3/041* (2006.01)
(Continued)

(52) U.S. Cl.
CPC .............. *G06F 3/044* (2013.01); *G06F 3/011* (2013.01); *G06F 3/016* (2013.01); *G06F 3/017* (2013.01);
(Continued)

(58) Field of Classification Search
CPC .......... G06F 3/011; G06F 3/016; G06F 3/017; G06F 3/03547; G06F 3/0393;
(Continued)

(56) References Cited

U.S. PATENT DOCUMENTS 9,767,613 B1 * 9/2017 Bedikian ............. G06F 3/04845
10,514,801 B2 * 12/2019 Pahud ................... G06F 3/0393
(Continued)

*Primary Examiner* — Liliana Cerullo
(74) *Attorney, Agent, or Firm* — Shook, Hardy & Bacon L.L.P.

(57) ABSTRACT

Systems and methods for enabling user-interactions with virtual objects (VOs) included in immersive environments (IEs) are provided. A head-mounted display (HMD) device is communicatively coupled with a hover-sensing (HS) device, via a communication session. The HMD device provides an IE to a wearer by displaying a field-of-view (FOV) that includes a VO. The user executes user-interactions, such as 2D and/or 3D hand gestures, fingertip gestures, multi-fingertip gestures, stylus gestures, hover gestures, and the like. The HS device detects the user-interactions and generates interaction data. The interaction data is provided to the HMD device via the communication session. The HMD device updates the FOV and/or the VO based on the interaction data. A physical overlay that includes a 3D protrusion is coupled with the HS device. The overlay is transparent to the hover-sensing capabilities of the HS device. The protrusion provides tactile feedback to the user for the user-interactions.

20 Claims, 13 Drawing Sheets

(51) Int. Cl.
  *G06F 3/01* (2006.01)
  *G06F 3/0481* (2013.01)
  *G06F 3/0488* (2013.01)
  *G06F 3/0354* (2013.01)
  *G06F 3/0484* (2013.01)

(52) U.S. Cl.
  CPC .......... *G06F 3/03547* (2013.01); *G06F 3/041* (2013.01); *G06F 3/0416* (2013.01); *G06F 3/04815* (2013.01); *G06F 3/04883* (2013.01); *G06F 3/04842* (2013.01); *G06F 2203/04108* (2013.01); *G06F 2203/04809* (2013.01)

(58) Field of Classification Search
  CPC ........ G06F 3/041; G06F 3/0416; G06F 3/044; G06F 3/04815; G06F 3/04842; G06F 3/04883; G06F 2203/04809; G06F 2203/04108
  See application file for complete search history.

(56) References Cited

U.S. PATENT DOCUMENTS

| | | | |
|---|---|---|---|
| 2006/0256090 A1* | 11/2006 | Huppi | A63F 13/02 345/173 |
| 2010/0045627 A1* | 2/2010 | Kennedy | H04N 1/00068 345/173 |
| 2010/0107127 A1* | 4/2010 | Han | G06F 3/011 715/848 |
| 2010/0328251 A1* | 12/2010 | Sinclair | G06F 3/04886 345/174 |
| 2011/0157056 A1* | 6/2011 | Karpfinger | G06F 3/0488 345/173 |
| 2013/0215029 A1* | 8/2013 | Comer, Jr. | G06F 3/016 345/161 |
| 2016/0313819 A1* | 10/2016 | Ancona | G06F 3/04186 |
| 2017/0262045 A1* | 9/2017 | Rouvinez | G06F 3/011 |
| 2017/0285842 A1* | 10/2017 | Kim | G06F 3/0488 |
| 2017/0364198 A1* | 12/2017 | Yoganandan | G06F 1/1694 |
| 2018/0173323 A1* | 6/2018 | Harvey | G06F 3/017 |

* cited by examiner

HOVER-BASED USER-INTERACTIONS WITH VIRTUAL OBJECTS WITHIN IMMERSIVE ENVIRONMENTS

CROSS REFERENCE TO RELATED APPLICATIONS

The present application is a continuation of and claims priority from application Ser. No. 15/624,097, filed Jun. 15, 2017, which is assigned or under obligation of assignment to the same entity as this application, the entire contents of the application being herein incorporated by reference.

BACKGROUND

Advancements in computing-technologies have fueled tremendous development efforts to deploy immersive environments in various computing-applications, such as simulation, gaming, and entertainment applications. For instance, various online gaming platforms have integrated virtual-reality (VR) environments, augmented-reality (AR) environments, and/or mixed-reality (MR) environments into gameplay. Deploying such immersive environments enables users to view and perceive computer-generated three-dimensional (3D) objects, as if the objects were actually present within the users' perceived environments. Various head-mounted display (HMD) devices, such as VR and/or AR headsets, have been developed to deploy immersive environments. Such HMD devices generally provide users a display of a field-of-view (FOV) that includes computer-generated 3D objects. That is to say, HMD devices provide a display of an immersive environment.

However, to enhance the user's experience within the immersive environment, it is advantageous to enable realistic user-interactions with computer-generated 3D objects displayed via a HMD device. For instance, the immersive experience may be enhanced by enabling a user to select, control, edit, rotate, translate, or otherwise manipulate various computer-generated 3D objects within the FOV provided by a HMD device. Furthermore, the user may desire to alter various aspects or characteristics of the provided FOV. Thus, for a truly immersive experience, the ability for the user to provide input to interact with computer-generated 3D objects is of tantamount importance. It is for these concerns and other concerns that the following disclosure is provided.

SUMMARY

Embodiments described herein provide methods and systems for providing realistic and intuitive user-interactions with virtual objects (VOs) included in immersive environments (IEs). More particularly, the various embodiments are directed towards commutatively coupling, via a communication session, a head-mounted display (HMD) device with an interaction-sensing (IS) device. The HMD device provides an IE to a wearer by displaying a field-of-view (FOV) that includes one or more VOs.

The user executes one or more gestures (i.e. user-interactions), such as but not limited to 2D and/or 3D hand gestures, fingertip gestures, multi-fingertip gestures, stylus gestures, hover gestures, and the like. The IS device detects, senses, and/or tracks the user-interactions. In response to such detections of user-interactions, the IS device generates interaction data, and provides at least a portion of the interaction data to the HMD device via the communication session. The FOV and/or one or more VOs included in the FOV are updated and/or modified in response to the interaction data received at the HMD device. Updating and/or modifying the FOV and/or the VO may indicate the user's intended user-interaction with the VO.

In some of the various embodiments, the IS device is separate from the HMD device, i.e. the IS device is not embedded within and/or not integrated with the HMD device. The IS device may include at least one of a hover-sensing (HS) device, a touch-and-hover (TAH) device, or a combination thereof. In other various embodiments, the IS device includes at least a 2D touch-sensitive device. In at least one of the various embodiments, the IS device includes multiple camera devices that detect and encode, via interaction data, the user-interactions.

In some embodiments, a physical overlay may be coupled with the IS device. For instance, when coupled to a HS device and/or a TAH device, one or more surfaces of the overlay (e.g. a protrusion) may be displaced from the active surface of the HS device and/or the TAH device. The overlay may be constructed from a material that is at least partially transparent to the hover-sensing capabilities of the HS and/or the TAH device. Thus, the user may touch the displaced surfaces of the overlay, and the hover-sensing capabilities of the HS device and/or the TAH device may detect the user's fingertips on the displaced surfaces. The displaced surfaces of overlay may provide one or more 2D and/or 3D shapes and/or protrusions. Such shapes or protrusions may include, but are not limited to curved bosses, parallelepipeds, cylinders, pyramids, and the like. Thus, the shapes and/or protrusions of displaced surfaces of the overlay provide tactile feedback for the user, when interacting with VOs.

BRIEF DESCRIPTION OF THE DRAWINGS

The present invention is described in detail below with reference to the attached drawing figures, wherein.

DETAILED DESCRIPTION

Figure 1:
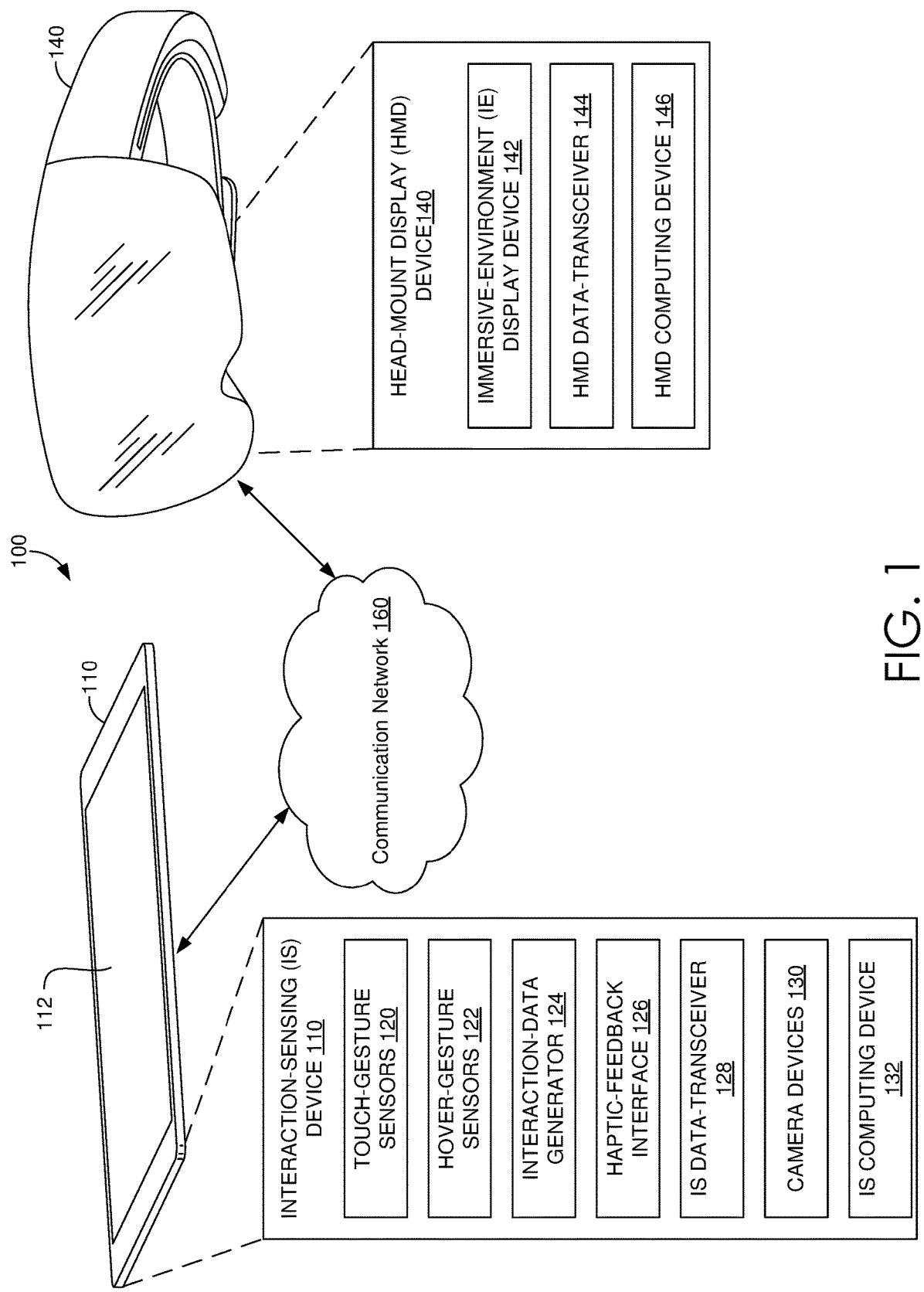
FIG. 1 is a block diagram of an exemplary computing environment that includes an interaction-sensing device communicatively coupled to a head-mounted display device and is suitable for use in implementing embodiments of the present disclosure.

As used herein, the term "virtualized object" (VO) may refer to any computer-generated object or any computer-generated visualization of a (physical or non-physical) object. Such computer-generated objects (or computer-generated visualizations thereof) may be one-dimensional (1D) objects, two-dimensional (2D), or three-dimensional (3D) objects (or visualizations thereof). As used herein, the term "immersive environment" (IE) may refer to any physical (i.e. "real") environment, any non-physical (i.e. "computer-generated" and/or "virtual") environment, or any combination thereof that includes a display of one or more VOs. Such IEs include, but are not otherwise limited to virtual-reality (VR) environments, augmented-reality (AR) environments, and/or mixed-reality (MR) environments.

As used herein, the term "interaction data" may refer to any data or information that indicates or encodes user-interactions (e.g. hand, fingertip, and multi-fingertip gestures). As used herein, an "interaction-sensing device," or simply a "IS device" may be any device that detects, senses, and/or tracks user-interactions, such as but not limited to hand gestures, fingertip gestures, multi-fingertip gestures, stylus gestures, and the like. In response to such detections of user-interactions, an IS device may generate interaction data that encodes the user-interactions. The generated interaction data may encode 2D and/or 3D hand, fingertip, or multi-fingertip gestures executed by a user. In some embodiments, an IS device may encode gestures of a stylus or a stylus-tip executed by a user.

In various embodiments, a IS device includes one or more wired and/or wireless data transceivers to provide another device, via a communication session, at least a portion of the generated interaction data. Such wireless data transceivers include, but are not otherwise limited to one or more communication radios. In some embodiments, a IS device may include a haptic-feedback interface, similar to haptic-feedback interfaces frequently included in mobile devices such as tablets and smartphones.

Development efforts in computing technologies have recently enabled "hover"-sensing (HS) devices. Such HS devices generally detect "hover-gestures" of hands, fingers, and fingertips (i.e. extremities) of a user, as well as the gestures of a stylus held by a user. Typically, a HS device includes one or more (planar and/or non-planar) active surfaces and associated hover-gesture sensors. Hover-gesture sensors may include proximity sensors. The associated proximity sensors detect the presence (or non-presence) of user extremities (e.g. the user's hands, fingers, and fingertips) in proximity to the one or more active surfaces. For some HS devices, the proximity sensors can determine, sense, and/or detect at approximate least 3D positions or locations of the user extremities (relative to the associated active surface), while the extremities are hovering and/or in motion proximate the active surface.

More specifically, when the user extremities are proximate to the one or more surfaces, a HS device is enabled to generate interaction data that indicates or encodes the 3D location, position, and/or motion of user extremities relative to the one or more active surfaces. Although the detection and encoding of the location and/or motion of the user's extremities are discussed throughout, it should be understood that a HS device may be employed to detect and encode other user-interactions, such as those initiated via a stylus held be the user.

The proximity sensors may be implemented via capacitive-sensing technologies, similar to those employed in touch-sensitive display devices. Typically, a HS device can detect user extremities that are within a threshold distance (i.e. a proximate-distance threshold) from the active surface. Different HS devices are associated with various proximate-distance thresholds. For some HS devices, the proximate-distance threshold is between 2.0 cm and 20.0 cm. The proximate-distance threshold of some HS devices is less than 10.0 cm. For at least one HS device, the proximate-distance threshold is about 4.0 cm.

Thus, a HS device may detect (and encode via interaction data) hover-gestures, similar to fingertip and multi-fingertip gestures often associated with touch-sensitive display devices. However, in contrast to the 2D fingertip gestures associated with touch-sensitive display devices, such hover-gestures may be 3D fingertip and multi-fingertip gestures. For instance, for a planar active surface of a HS device, a Cartesian coordinate system may be employed. The x-y plane of the Cartesian coordinate system may be substantially co-planar with (and the z-axis of the Cartesian coordinate system may be substantially orthogonal to) the planar active surface of a HS device.

More particularly, capacitive proximity sensors embedded in and/or integrated with a planar active surface of a HS device detect the user's fingertips that are hovering and/or in motions proximate the active surface. In response to the detection, the HS device generates interaction data encoding the x-coordinate, y-coordinate, and z-coordinate of one or more of the user's fingertips (relative to the active surface), as long as the z-coordinate of fingertip is less than the proximate-distance threshold of the proximity sensors associated with the active surface. The resolution of the proximity sensors in each dimension may be similar or may be different, depending on the specific proximity sensors embedded in the HS device. For HS devices with non-planar active surfaces, other orthonormal 3D coordinate systems may be employed, such as but not limited to spherical coordinates or cylindrical coordinates, depending on the shape of the non-planar active surfaces.

As such, a HS device may be employed to detect and encode various user-interactions, such as but not limited to 3D-versions of any 2D gesture associated with touch-sensitive displace devices, such as but not limited to 3D versions of "pinch," "pull," "press and hold," "single-finger tap," "two-finger tap," "single tap," "double tap," "swipe left," "swipe right", pressure-variance (e.g. 3D-touch) gestures, and the like. Furthermore, a HS device may be employed to detect and encode, hand-writing, notes, sketches, drawings, and other user-interactions initiated via the user's fingertips and/or a stylus held and guided by the user's hands.

The hover-sensing capabilities of a HS device may be integrated with a touch-sensitive device, such as but not limited to a touch-sensitive display device, to generate a touch-and-hover (TAH) device. The touch-sensitive device detects and encodes the 2D touch of the user's extremities, as well as the 3D hover-gestures of the user's extremities. That is, the active surface functions similar to the touch-sensitive surface of a touch-sensitive display device. As such, a TAH device may detect and encode all of the 2D fingertip, multi-fingertip, and stylus-tip gestures (on the active surface) associated with a touch-sensitive display device, as well as the 3D fingertip, multi-fingertip, and stylus-tip gestures in proximity to the active surface. Thus, a TAH device is a HS device. The touch-sensitive surface of a TAH device may also be a display device, but need not be.

Thus, in some embodiments, a IS device includes at least one of a HS device, a TAH device, or a combination thereof. In other various embodiments, a IS device includes at least a 2D touch-sensitive device. In some embodiments, the IS device may include a 2D touch-sensitive display device. In other embodiments, the IS device does not include a display device. For instance, an IS device may include a 2D touch-sensitive tracking pad or a TAH device that does not include a display device (i.e. the touch-sensitive device is not a display device). In at least one of the various embodiments, an IS device includes a gaming and/or an entertainment system that includes various combinations of proximity sensors, motion sensors, cameras, and the like. Such combinations of cameras and/or motion sensors may be enabled to detect and encode the user's movements through gameplay, via generated interaction data.

In the various embodiments, IS devices may include touch-sensitive device, such as a touch-sensitive display device, where the touch-sensitive device is a multi-touch display device. That is, the touch-sensitive device that detects and/or senses two or more points of contact. In addition to being touch-sensitive, an IS device may include a pressure-sensitive device, such as a pressure-sensitive display device. Such IS device may detect 3D gestures via multi-pressure touch or fingertip gestures. That is a user may provide 3D gestures by the pressure-sensitive device via pressure-variance gestures, e.g., 3D-touch. For instance, the 3D information provided via a HS may be similarly provided via pressure-variance gestures and a pressure-sensitive device.

In some embodiments, a IS device may include any combination of a touch-sensitive, pressure-sensitive device, hover-sensitive device. That is, a touch-sensitive device included in a IS device may also be pressure-sensitive and/or hover-sensitive. Thus, a IS device may detect 3D via touch, pressure, and/or hovering-like gestures. In other embodiments herein, 3D gestures may be detected via one or more devices, such as IS devices by employing one or more photon-detectors (e.g., a camera) to track the motion of fingertips hovering over a 2D touch-sensitive surface. For instance, a matrix of photon-detectors may be employed to detect gestures my detecting photons reflected from the users fingertips. Similarly, an IS device may track the user's gestures via acoustic and/or ultra-sound imaging. In some embodiments, an IS device may include magnetic sensors and the users wears magnetic rings. The IS device may detect the 3D gestures via the magnetic sensors and the magnetic rings. In other embodiments, user gestures may be detected the sensing of interaction with mechanical and/or active devices or parts, such as but not limited to switches, dials, levers, buttons, joysticks, trackballs, clickable devices, and the like. An IS device may include data gloves and other sensing devices, such as exoskeletons. Such IS devices may be enabled to detect gestures over a mobile device, such as a tablet. Any of these IS devices may also provide haptic feedback in the various embodiments.

In addition to HS devices and TAH devices, development efforts in computing technologies have also resulted in the development of various head-mounted display (HMD) devices. Such HMD devices generally enable the realistic perception of computer-generated two-dimensional (2D) and/or three-dimensional (3D) objects. More particularly, an HMD device provides, to a user wearing the HMD device, a visualization (or display) of a field-of-view (FOV) that includes one or more virtualized objects (VOs). As such, an HMD device provides a display or visualization of VOs within an immersive environment (IE).

A user may wish to interact with the VOs within an IE. For example, a user may wish to select, control, edit, rotate, translate, or otherwise manipulate a VO. Similarly, a user may wish to interact with various discrete features, structures, components, modules, controls, or other parts of a VO. Some HMD devices enable limited user-interactions with VOs. For instance, some HMD devices include embedded motion sensors (e.g. cameras) that detect broad user hand-gestures through free space. Upon detection of such a free-space gesture, the HMD device may modify a VO.

However, the spatial-resolution of such embedded motion sensors (and thus the user-interactions) may be limited. For instance, unless the user positions their hands in close proximity to HMD device, the angular resolution of optical systems associated with the embedded motion sensors may limit the ability to resolve relative small spatial-differences in the position of the user's hands. Such limited resolution may limit the user's ability to select, edit, or otherwise manipulate closely-spaced VOs or closely-spaced features of a VO. Additionally, such HMD devices may require a direct optical line-of-sight between the user's hands and the embedded motion sensors. For example, if an optically opaque surface (e.g. a desktop) is between the user's hands and the HMD device, or if the user positions their hands in proximity of their waist, the detection functionalities of embedded motion sensors may be limited.

In addition to spatial-resolution considerations, hand gestures through free space lack tactile and haptic feedback associated with other physical objects. Considering an example where a user desires to select and rotate a virtualized object (e.g. the user wants to select and rotate a virtual globe within an IE), a user employing free-space hand gestures does not experience the feedback of an associated physical object interacting with their hand or fingertips. Additionally, in some immersive applications, there may be limits to the allowed user-interactions. For example, within an immersive gaming-environment, there may be virtualized walls or other VOs that the user's hands (or a selected VO) may collide with. Free-space hand-gesture initiated user-interactions lack tactile and haptic feedback of such collision events. Additionally, such unrestrained free-space gestures may not provide intuitive user-interactions for the manipulations of VOs that are proxies to physical objects.

Furthermore, at least due to the significant adoption of touch-sensitive display devices, users have become accustomed to interacting with applications running on computing devices, via intuitive fingertip gestures. For instance, since the integration of touch-sensitive display devices within mobile devices (e.g. smartphones, tablets, smartwatches, and the like), users have become familiar with user-interactions within mobile applications via intuitive fingertip gestures. Such fingertip gestures may include multi-touch (or multi-fingertip) gestures, such as but not otherwise limited to "pinch," "pull," "press and hold," "single-finger tap," "two-finger tap," "single tap," "double tap," "swipe left," "swipe right", pressure-variance (e.g. 3D-touch) gestures, and the like. Multi-touch gestures may even enable simultaneous interactions with multiple components of a computing application. For example, a user may simultaneously select multiple icons on a smartphone via multi fingertip touches to separate portions of the touch-sensitive display device.

Such heavily-adopted intuitive user-interactions may be difficult to implement via hand gestures though free space that are detected via motion sensors embedded in a HMD device. For instance, it may be difficult for resolution-limited HMD-device motion sensors to resolve the spatial resolution of multiple closely-spaced fingertips. That is to say, the spatial resolution of such a touch-sensitive device may be greater than that of motion sensors. Another issue with convention motion sensors is occlusions. For instance, some of the user's fingers may occlude other fingers of the user. Also, the detection of fingertip gestures that are based on physical contact with a touch-sensitive display device is a challenge. For example, hand gestures through free space may not realistically emulate the user-experience associated with "tap," and "press and hold" fingertip gestures that are popular with touch-sensitive display devices. That is to say, free-space hand gestures lack the tactile feedback of tapping and swiping on a touch-sensitive display device.

Other limitations of free space user-interactions include that the user must suspend their hands in free space without support. The user's muscle may begin to tire after long usage. Additionally, the length of the user's arm is limited. In some situations, the arm of the user may be used as a pointer, at the expense of the resolution or accuracy of the gesture detecting. Such limitations of free space user-interactions, associated with motion sensors embedded in a HMD device, may decrease the "immersive experience" for the user interacting with VOs within an IE.

The various embodiments herein are directed to systems and methods that enable realistic and intuitive user-interactions with VOs included in an IE. As discussed throughout, the various embodiments herein address each of the above noted limitations of previously available methods and systems for interacting with VOs. More particularly, the various embodiments are directed towards commutatively coupling, via a communication session, a head-mounted display (HMD) device with an interaction-sensing (IS) device. The user executes one or more gestures, such as but not limited to 2D and/or 3D hand gestures, fingertip gestures, multi-fingertip gestures, stylus gestures, and the like. By executing such gestures, the user intends to interact with one or more of the VOs included in the IE (i.e. the user intends to execute user-interactions with a VO).

The IS device detects, senses, and/or tracks the user-interactions. In response to such detections of user-interactions, the IS device generates interaction data, and provides at least a portion of the interaction data to the HMD device via the communication session. The FOV and/or one or more VOs within the IE are updated and/or modified in response to the interaction data received at the HMD device. Updating and/or modifying the FOV and/or the VO may indicate the user's intended user-interaction with the VO.

In some of the various embodiments, the IS device is separate from the HMD device, i.e. the IS device is not embedded within and/or not integrated with the HMD device. The IS device may include at least one of a HS device, a TAH device, or a combination thereof. In other various embodiments, the IS device includes at least a 2D touch-sensitive device. In at least one of the various embodiments, the IS device includes multiple camera devices that detect and encode, via interaction data, the user-interactions.

In some embodiments, a physical overlay may be coupled with the IS device. For instance, when coupled to a HS device and/or a TAH device, one or more surfaces of the overlay may be displaced from the active surface of the HS device and/or the TAH device. The overlay may be constructed from a material that is at least partially transparent to the hover-sensing capabilities of the HS and/or the TAH device. Thus, the user may touch the displaced surfaces of the overlay, and the hover-sensing capabilities of the HS device and/or the TAH device may detect the user's fingertips on the displaced surfaces. The displaced surfaces of overlay may provide one or more 2D and/or 3D shapes and/or protrusions. Such shapes or protrusions may include, but are not limited to curved bosses, parallelepipeds, cylinders, pyramids, and the like. Thus, the shapes and/or protrusions of displaced surfaces of the overlay provide tactile feedback for the user, when interacting with VOs.

In various embodiments, the IS device may automatically determine an identifier associated with the overlay. A mode of the MHD device may be updated based on the identifier of the overlay. In some embodiments, the motion of the user's fingertips along the displaced surfaces of the overlay may be detected and encoded via the interaction data. The interaction data is employed to determine the shape and/or identify the protrusions provided by the displaced surfaces. The FOV and/or a VO may be updated and/or modified based on the determined shape.

In various embodiment, the 2D surface of the IS may be mapped to the 2D surface of a 3D virtual or real object in the environment. Moving a finger over the touch surface, will move a point on the surface of the object, where the mapping between the surface area and the IS surface is define the same way, as definition of texture mapping. Furthermore, hovering or elevating a finger above the IS surface, will move the corresponding 3D point, in the direction of the 3D surface normal, away from the object.

A haptic-feedback interface included in the IS device may be employed to provide haptic feedback to the user in accordance with events occurring within the FOV. Thus, the shapes and/or protrusions of an overlay, as well as the haptic-feedback interface of the IS device provide the user tactile and/or haptic feedback when interaction with VOs. When an overlay is not coupled with the IS device, the user may additionally interact with a VO, via 2D fingertip and multi-fingertip gestures on the touch-sensitive device of the IS device. Thus, the user may be provided with tactile feedback via the touch-sensitive surfaces of a IS device.

Furthermore, as discussed throughout, hover gestures detected via the various IS devices may enable more precise and accurate user-interactions with VOs, given the increased spatial resolutions of hover-sensing and touch-sensing active surfaces of IS devices. Additionally, surfaces of an IS, such as but not limited to touch-sensitive surfaces and surfaces of an IS overlay provide support and friction for the user's fingertips. Such friction may enable precise movement of the user's fingers.

With reference now to FIG. 1, a block diagram of an exemplary computing environment 100 that is suitable for use in implementing embodiments of the present disclosure. System 100 includes an interaction-sensing (IS) device 110 and a head-mounted display (HMD) device 140. More particularly, FIG. 1 shows both a non-limiting physical form factor embodiment, and a non-limiting component block diagram, for each of IS device 110 and HMD device 140.

A communication network 160 communicatively couples IS device 110 and HMD device 140, via a communication session. In some embodiments, communication network 160 is peer-to-peer (P2P) network that enables the communication session between IS device 110 and HMD device 140. For instance, IS device 110 and HMD device 140 may be paired via a P2P communication session. In other embodiments, communication network 160 may include, without limitation, one or more local area networks (LANs) and/or wide area networks (WANs). In exemplary implementations, network 160 comprises the Internet and/or a cellular network, amongst any of a variety of possible public and/or private networks.

Although FIG. 1 shows a single IS device coupled to HMD device 140, it should be notes that multiple IS devices could be coupled to HMD device 140. For instance, at least two IS devices, one for each hand of a user, may be coupled to HMD device 140. In other embodiments, one or more IS devices may be coupled to HMD device 140, where one or more users of the one or more coupled IS devices are not wearing the HMD device 140. That is, a user of IS device 110 may not be the same user that is wearing HMD device 140. Similarly, IS device 110 may be couple to more than one HMD device. That is, a single IS device may be coupled and/or paired with multiple HMD devices.

IS device 110 may include a 2D touch-sensitive surface 112. Touch-sensitive surface 112 may include a touch-sensitive device, such as but not limited to a touch-sensitive display device similar to those frequently used in computing devices, such as smartphones and tablets. However, touch-sensitive surface 112 need not be a display device. As shown in FIG. 1. Touch-sensitive surface 112 may be a planar surface, but may alternatively include non-planar (i.e. curved) surfaces.

IS device 110 includes touch-gesture sensors 120 that sense or detect touch-gestures on touch-sensitive surface 112. More particularly, touch-gesture sensors 120 may sense and/or detect 2D touch-gestures associated with touch-sensitive devices. That us, touch-gesture sensors 120 may sense and/or detect hand, fingertip, multi-fingertip, and stylus gestures such as but not limited to "pinch," "pull," "press and hold," "single-finger tap," "two-finger tap," "single tap," "double tap," "swipe left," "swipe right", pressure-variance (e.g. 3D-touch) gestures, and the like. In various embodiments, touch-gesture sensors 120 may be captivate-sensing sensors. Thus, touch-sensitive surface 112 may be a 2D capacitive-sensing surface.

In some embodiments, IS device 110 may be a hover-sensing (HS) device. In at least one embodiment, IS device 110 may be a touch-and-hover (TAH) device. In such embodiments, touch-sensitive surface 112 may additionally be an active surface of the HS device, i.e. IS device 110 may sense hover gestures in proximity to touch-sensitive surface 112. Accordingly, surface 112 may be both touch-sensitive and hover-sensitive. More particularly, IS device may include hover-gesture sensors 122, such as but not limited to proximity and/or motion sensors, that sense and/or detect hover-gestures in proximity to touch-sensitive surface 112. Such hover gestures include but are not limited to 3D hand, fingertip, multi-fingertip, and stylus gestures. For instance, hover-gesture sensors 122 may sense and/or detect 3D versions of fingertip gestures associated with touch-sensitive devices, such as but not limited to 3D versions of "pinch," "pull," "press and hold," "single-finger tap," "two-finger tap," "single tap," "double tap," "swipe left," "swipe right", pressure-variance (e.g. 3D-touch) gestures, and the like.

In various embodiments, hover-gesture sensors 122 may be captivate-sensing sensors. Thus, touch-sensitive surface 112 may be a 3D capacitive-sensing surface. In at least one embodiment, IS device 110 does not include a touch-sensitive surface and/or touch-sensitive sensors. That is, surface 112 may be only a hover-sensing surface (i.e. surface 112 is not a touch-sensitive surface).

IS device 110 includes an interaction-data generator 124 that generates interaction data that encodes the touch and hover gestures sensed and/or detected via touch-gesture sensors 120 and hover-gesture sensors 122 respectively. Interaction-data generator 124 may process, package, encrypt, or other otherwise prepare the interaction data for transmission to HMD device 140. IS device 110 includes IS data-transceiver 128, which may be a wired or a wireless data transceiver. Such wireless data transceivers include, but are not otherwise limited to one or more communication radios. IS data-transceiver 128 is enabled to provide HMD device 140 the interaction data, via the communication session enabled by communication network 160.

In some embodiments, IS device 110 includes a haptic-feedback interface, such as those commonly integrated in smartphones, tablets, video-game controller devices, and the like. IS device 110 may include a plurality of camera devices that sense and/or detect free-space gestures of a user. Interaction-data generator 124 may generate interaction data encoding such free-space gestures. In various embodiments, IS device 110 includes one or more additional components included in a computing device. In at least one embodiment, IS device 110 device includes a IS computing device 130. Various embodiments of computing devices are discussed in conjunction with at least FIG. 10.

HMD device 140 includes an immersive-environment (IE) display device 142 that is enabled to provide a display and/or a visualization of one or more virtual objects (VOs) to a user wearing HMD device 140. HMD device 140 also includes a wired and/or wireless data transceiver, such as HMD data-transceiver 114. HMD data-transceiver is enabled to receive the interaction data, provided via IS data-transceiver 128 of IS device 110. MHD device 140 may additionally include a computing device, such as HMD computing device 146. Other embodiments of a HMD device are discussed in conjunction with at least FIG. 9.

Figure 2A:
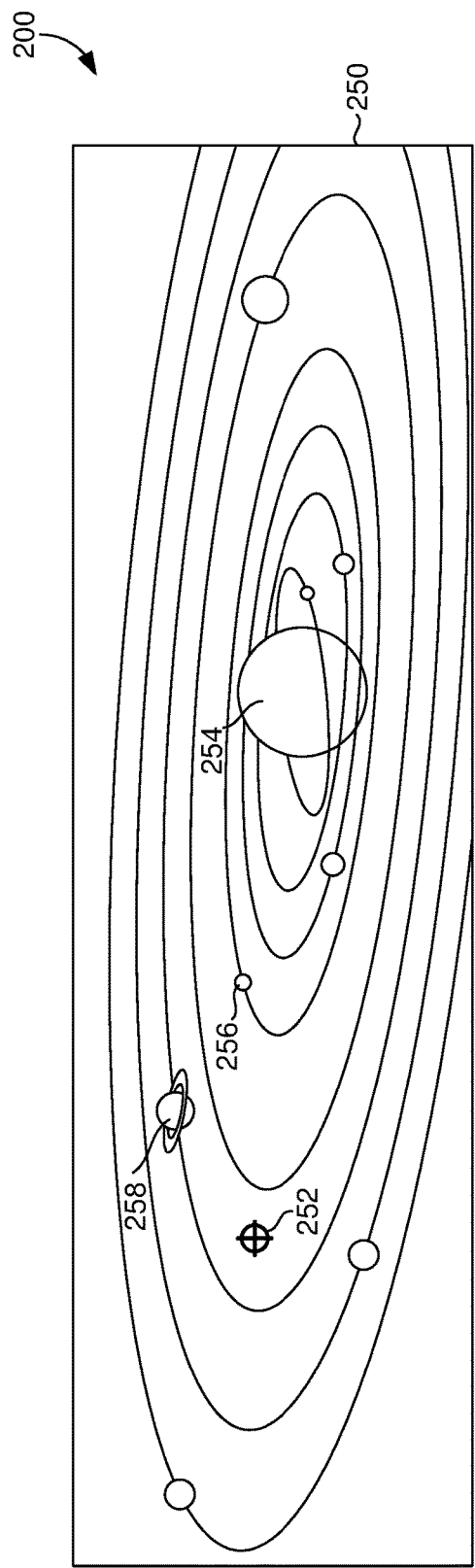
FIG. 2A is a schematic showing of an exemplary user-interaction with a virtual object that is enabled via an interaction-sensing device, in accordance with some embodiments of the present disclosure.
Figure 2A:
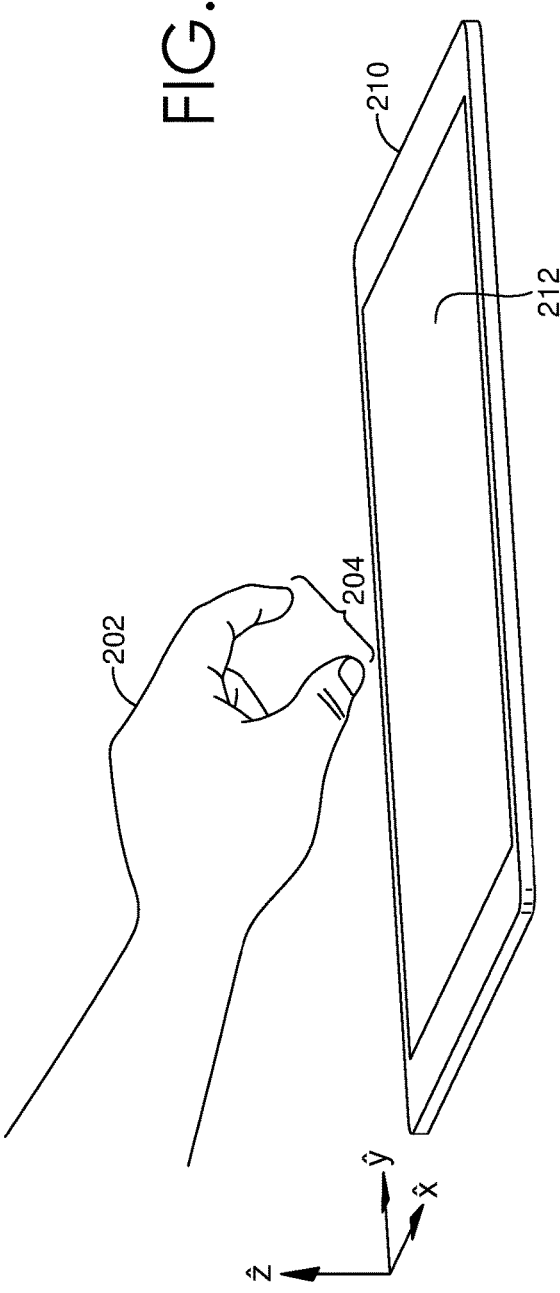

FIG. 2A is a schematic 200 showing an exemplary user-interaction with a virtual object (VO) that is enabled via interaction-sensing (IS) device 210, in accordance with some embodiments of the present disclosure. IS device 210 may include similar features to those of IS device 110 of FIG. 1. As such, IS device 110 may be a HS device and/or a TAH device. IS device 110 includes a surface 212. Surface 212 may be a hover-sensing surface, a touch-sensitive surface, and/or a combination thereof. A Cartesian coordinate system is shown in FIG. 1. The x-y plane of the Cartesian coordinate system is substantially coincident with the planar surface 212. The z-axis of the coordinate system is substantially orthogonal to planar surface 212.

IS device 110 may be paired with a HMD device, such as but not limited to HMD device 140 of FIG. 1, via a communication session. The HMD device provides a field-of-view (FOV) 250 to a user wearing the HMD device. FOV 250 includes various virtualized objects (VOs) that represent a 3D view of the solar system. It should be understood that other FOVs and VOs are consistent with the various embodiments. One VO included in FOV 250 is selection cursor 252. Other VOs included in FOV 250 includes, but are not limited to holograms or 3D visualizations of Earth 256, the Sun 254, and Saturn 258.

IS device 210 may generate interaction data that encodes the touch and hover gestures of a user. The interaction data may be provided to the HMD device, via the communication session. The HMD device may update and/or modify the FOV 250 and/or any VOs included in FOV 250 based on the interaction data. Thus, the user can interact with the FOV 250 and/or any VOs included in the FOV 250. For instance, the user may select, control, edit, rotate, translate, or otherwise manipulate a VO (or features of a VO). Similarly, a user may alter various aspects, characteristics, or properties the provided FOV 250.

More particularly, FIG. 1 shows the user's hand 202. Multiple fingertips 204 of hand 202 are shown in a 3D hover-gesture. Note, the z-coordinate of each of the fingertips 204 is greater than 0.0, i.e. the fingertips 204 are "hovering" above (and not touching) hover-sensing surface 212. The 3D hover gestures of a user may control the operation of selection cursor 252 within the 3D FOV 250. For instance, the user may manipulate the 3D location or position of the selection cursor 252 within the 3D FOV 250. The hover-gestures may be employed to select, control, or otherwise manipulate other VOs included in FOV 250, such as but not limited to the holograms or visualizations of the Sun 254, the Earth 256, or Saturn 258.

Thus, virtually any user-interaction with a VO within an IE may be enabled via the communicatively coupling of IS device 210 with a HMD device. The spatial-resolution of the touch and hover gestures encoded in the interaction data may be greater than the spatial-resolution associated with detecting free-space gestures via motion sensors embedded within the HMD device. Accordingly, the spatial-resolution associated with user-interactions enabled via IS device 210 may be greater than the spatial-resolution associated with previously available systems and methods for enabling user-interactions with VOs. Additionally, IS device 210 enables interacting with VOs within an IE via 2D and 3D versions of pinch," "pull," "press and hold," "single-finger tap," "two-finger tap," "single tap," "double tap," "swipe left," "swipe right", pressure-variance (e.g. 3D-touch) gestures, and other fingertip and multi-fingertip gestures commonly employed by users of 2D touch-sensitive display devices. The emulation of such 3D user-interactions may not be as readily accomplished via previously available methods of detecting free-space gestures.

In the various embodiments, touch and hover gestures may be combined to generate additional gestures. For instance, one finger may touch the display for support, while another finger is hovering to define position in space. In such embodiments, the hand is supported, as well as the user muscles are used to sense the distance from the IS in a very accurate and non-visual way. In at least one embodiment, the distance between the finger on the IS device and the hovering finger, can define a vertical scale of an object. The position of a second finger (such as the thumb) can change the meaning of the touch gesture (for example from dragging to selection).

Although FIG. 2A shows a single IS device 210 paired with an HMD device, it should be understood that multiple IS devices may be paired with a MHD device. For instance, at least two IS devices may be paired with an HMD device, one for each hand of the user. Accordingly, the user may set each IS device on a stable surface, such as a table, and may control multiple VOs via multiple hand gestures, where each hand hovers over a respective IS device. Additionally, one or more IS devices may be coupled to the HMD device, where the users of the one or more IS devices are separate and/or remote from the user that is wearing the HMD device. Similarly, a single IS device may be coupled to multiple HMD devices. For instance, a user of IS device 210 may control and/or manipulate one or more VOs that are simultaneously being shown to multiple users via multiple HMD devices.

Figure 2B:
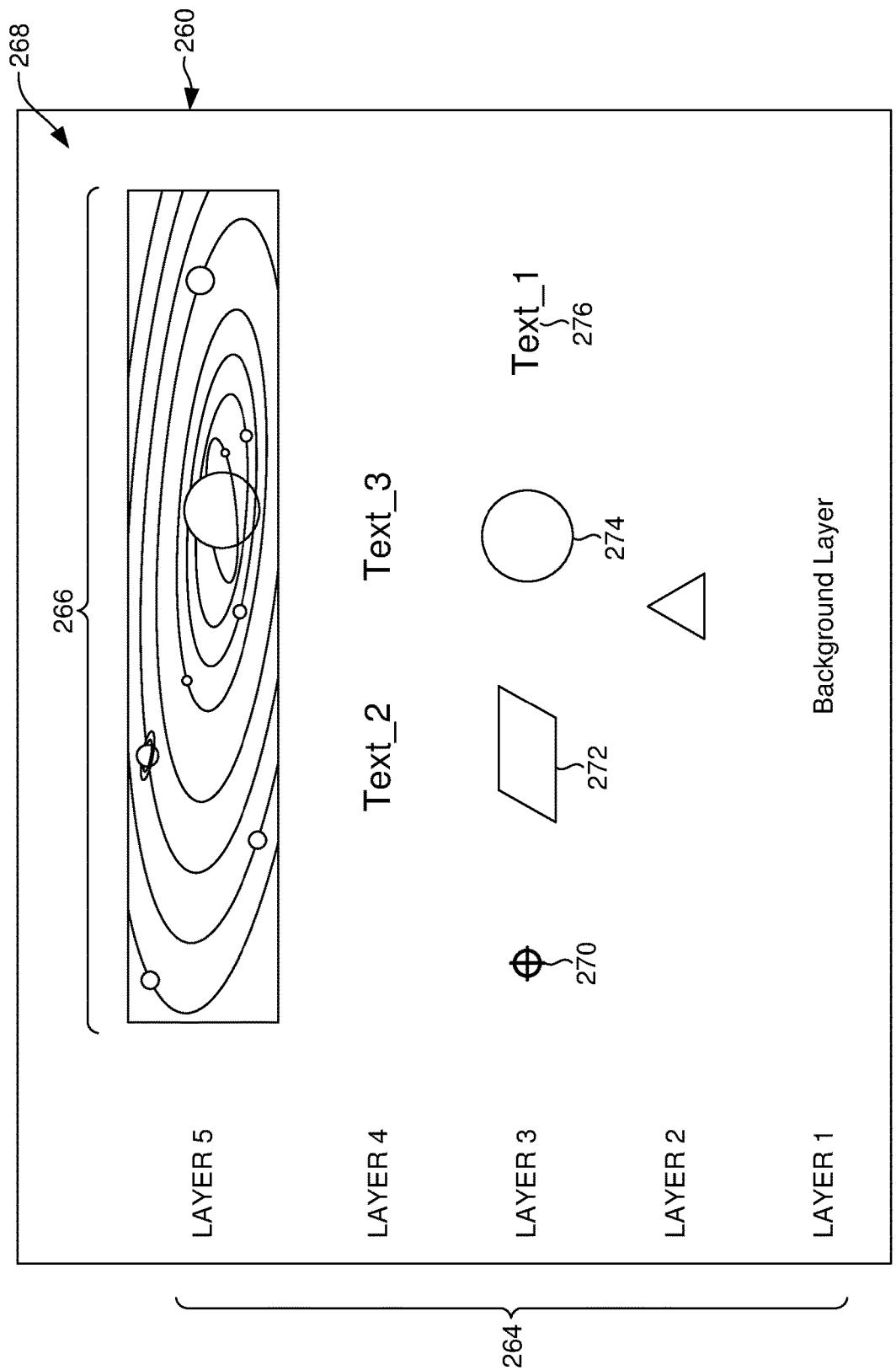
FIG. 2B is a schematic showing of an exemplary embodiment of a user selecting a layer of a virtual object to correlate with a touch-sensitive surface of an interaction-sensing device, in accordance with some embodiments of the present disclosure.

FIG. 2B is a schematic showing of an exemplary embodiment of a user selecting a layer (i.e. a planar slice) of a virtual object to correlate with a touch-sensitive surface of an interaction-sensing device, in accordance with some embodiments of the present disclosure. More particularly, FIG. 2 shows a FOV 260 (provided via a HMD device). FOV 260 may include either a "flat" or 3D representation 268 of a plurality of layers 264 of a layered object. For instance, representation 268 may be a representation of the various layers included in a layered document, such as but not limited to a presentation slide.

In the non-limiting embodiment shown in FIG. 2B, each of layers 1-5 of a presentation slide are shown via a "flat" presentation of the plurality of layers 264, projected and/or displayed within FOV 260. Each layer includes one or more 2D and/or 3D VOs. Layer 1 is a background layer that includes a background color or pattern, Layer 2 includes a single (2D or 3D) triangular VO, and Layer 3 includes a (2D or 3D) parallelogram-like VO 272, a (2D or 3D) circular VO 274, and a first text box 276 (i.e. "Text_1"). Layer 4 includes two text boxes (i.e. "Text_2" and "Text_3"). Layer 5 includes a 2D or a 3D visualization 266 of a solar system, such as the solar system provided in FOV 250 of FIG. 2A, that is embedded in Layer 5 of the layered document.

Note, that the presentation of the layers of a multilayered object within a 3D FOV need not be "flat" as depicted in FIG. 2B. That is, the multi-layers may be shown in a more 3D presentation within a FOV. Whether the presentation of the layers is "flat" or 3D, a user may select a layer via a selection cursor 270, or some other mechanism. More particularly, the user may employ 3D hover gestures, detected via a IS device, such as but not limited to IS device 210 of FIG. 2A to select a layer (or planar slice) of a VO.

The selection of the layer or planar slice of the VO, via a hover gesture detected by the IS device, may result in a "pinning" (or correlation) of the layer with a touch-sensitive surface of the IS device. That is to say, the plane of the selected layer is pinned or correlated with the plane of a touch-sensitive surface of the IS device. More specifically, once a layer or planar slice of a VO (e.g. Layer 3 of the presentation slide of FIG. 2B) has been selected, the FOV provided by the HMD device may be transitioned to include a "flat" or 3D visualization of the selected layer. Furthermore, once correlated with the touch-sensitive surface, the user may modify, edit, update, or otherwise manipulate the selected layer (or planar slice) of the VO via finger or multi-finger 2D touch gestures on the touch-sensitive surface. The user may observe the user-interactions with the VOs within the selected layer via modifications and/or updates within the FOV provided by the HMD device.

A hovering finger may select a plane above the IS device in a continues motion upward-downward. The selection of such a plane, may bring a cut-out of a 3D object presented above the IS device, to be displayed on the screen of the IS. In a similar manner, a hovering finger may move a 3D virtual object into and out of the FOV of the hover device of the IS. As the object is pushed into FOV of the IS, the IS may display different layers/cutouts of the object. In another embodiment the IS device can be hold in 3D space inside a 3D object, and by touching the IS, it may copy a slice of the 3D object onto the IS display. The user may hold, examine, annotate, or manipulated the object or slice of the object.

Figure 2C:
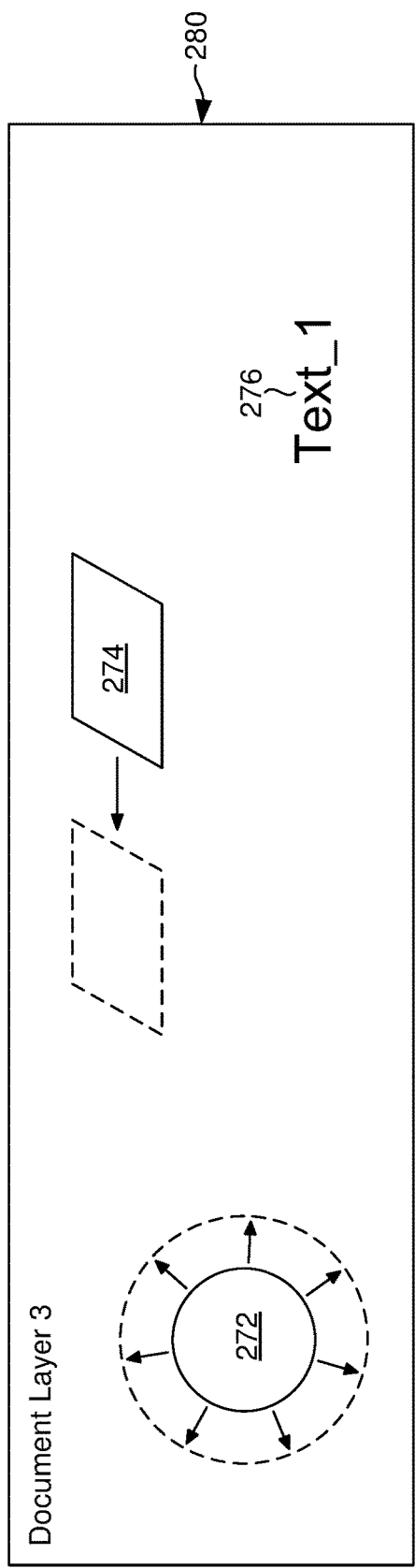
FIG. 2C is a schematic showing of an exemplary embodiment of a user modifying the selected layer of the virtual object by touching the touch-sensitive surface of the interaction sensing-device, in accordance with some embodiments of the present disclosure.
Figure 2C:
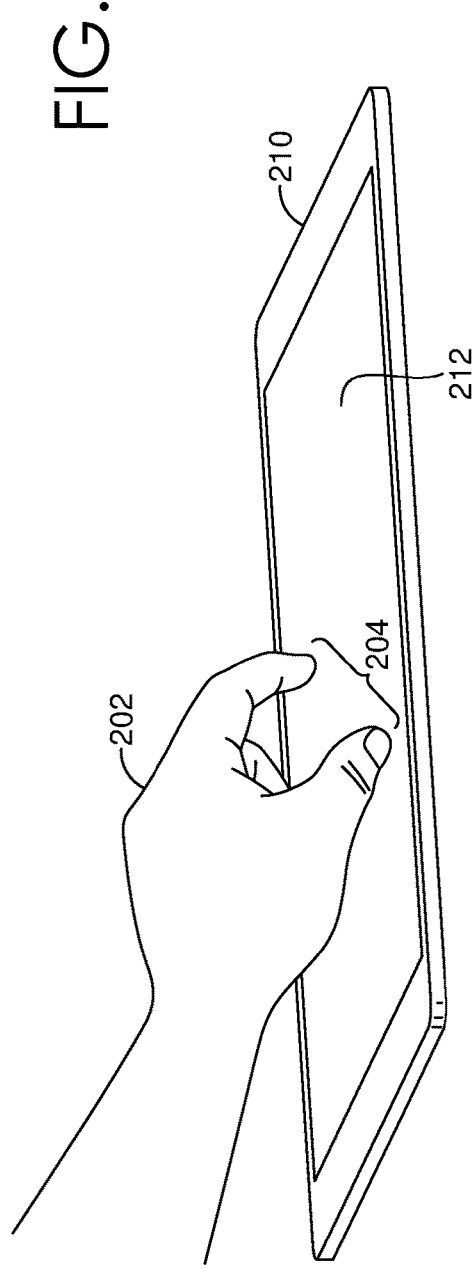

FIG. 2C is a schematic showing of an exemplary embodiment of a user modifying the selected layer of the virtual object by touching the touch-sensitive surface of the interaction sensing-device, in accordance with some embodiments of the present disclosure. As shown in FIG. 2C, a visualization of the selected Layer 3 of the presentation slide of FIG. 2B is included in FOV 280, via the HMD device. That is to say, FOV 200 includes parallelogram-like VO 272, circular VO 274, and text box 276. The user may modify, edit, update, or otherwise manipulate any of these VOs via finger or multi-finger 2D touch gestures. FIG. 2C shows user's hand 202 and fingertips 204 perform 2D touch gestures with touch-sensitive surface 212 of IS device 210.

Fingers 204 are in physical contact with touch-sensitive surface 212. More specifically, via common 2D fingertip and multi-fingertip gestures (e.g. "pinch," "pull," "press and hold," "single-finger tap," "two-finger tap," "single tap," "double tap," "swipe left," "swipe right", pressure-variance (e.g. 3D-touch) gestures, and the like), the user may re-size, rotate, translate, re-position, edit text, or otherwise interact with and manipulate any of VOs 272, 272, and 276.

The touch of the touch-sensitive surface on the user's fingertips may provide tactile feedback for the user, enabling more realistic, controlled, and precise user-interactions with various VOs included in the selected and pinned (or correlated) layer. Furthermore, the spatial resolution of the 2D touch-sensitive surface (i.e. the spatial resolution in the x-y plane) may be greater than the spatial resolution associated with 3D hover gestures. That is, the interaction data may more accurately encode the (x-axis and y-axis) positions and motions of the user's fingertips, when the fingertips are in contact with the touch-sensitive surface, as compared to when the fingertips are hovering above the touch-sensitive surface. Thus, by correlating a layer or planar-slice of a VO object to a touch-sensitive surface of the IS device, a user may more precisely and accurately interact with various VOs within an IE.

Figure 3A:
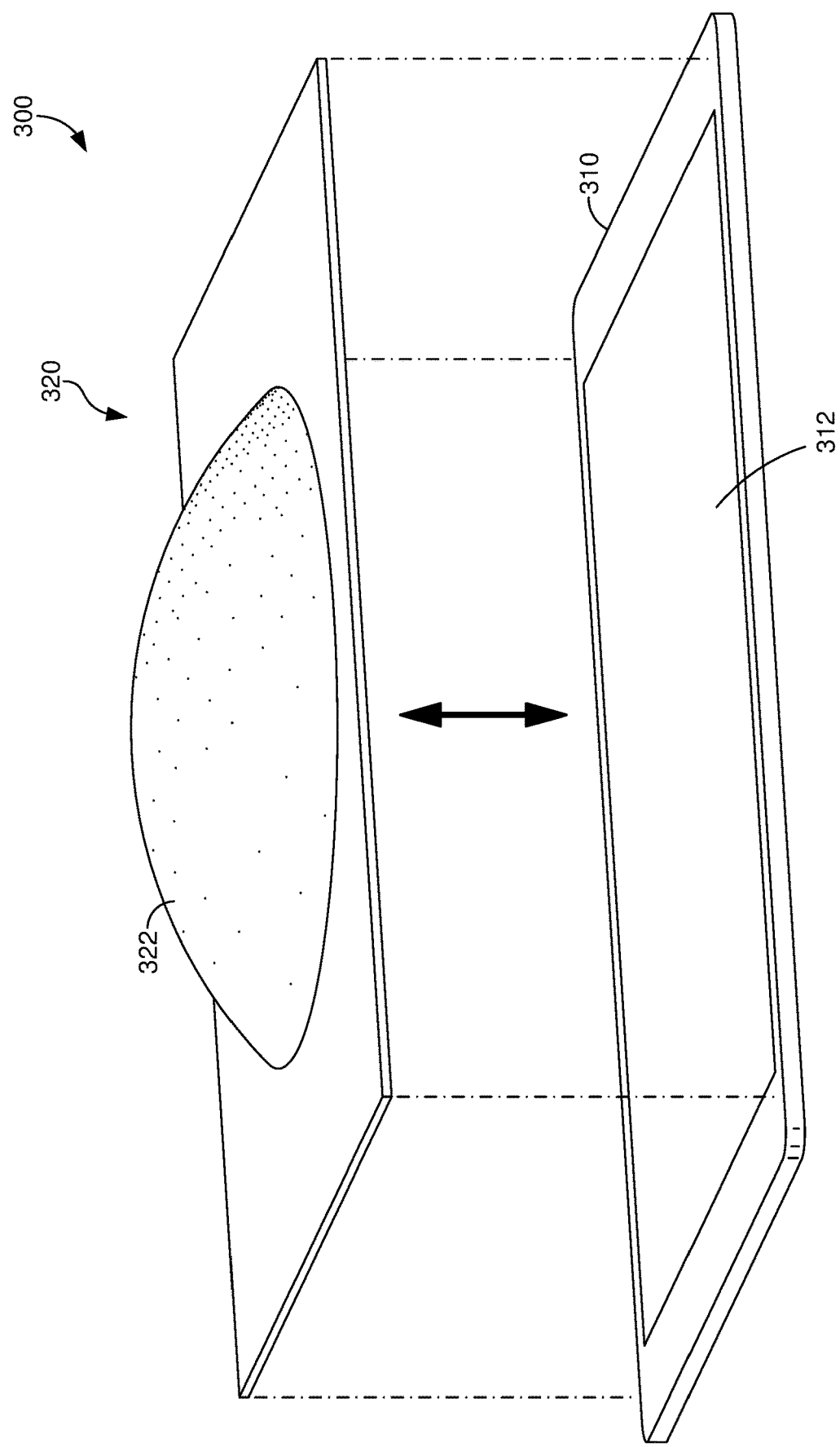
FIG. 3A is a schematic showing of a step of mechanically coupling an exemplary embodiment of an overlay with an interaction-sensing device, in accordance with some embodiments of the present disclosure.

FIG. 3A is a schematic showing a step of mechanically coupling an exemplary embodiment of an overlay with an interaction-sensing (IS) device, in accordance with some embodiments of the present disclosure. System 300 includes IS device 310 and overlay 320. Overlay 320 may be a physical overlay. IS device 310 may be similar to IS device 110 of FIG. 1 or IS device 210 of FIGS. 2A-2C. As such, IS device 310 may include an active surface 312, such that IS device detects hover gestures in proximity to active surface 312 (i.e. hover gestures that are within the proximity-distance threshold of active surface 312).

Overlay 320 is configured and arranged for mechanically coupling or otherwise interfacing with IS device 310. For instance, overlay 320 may be configured and arranged to "snap" onto or otherwise become fixably attached to IS device 310. Overlay 320 can include a 3D protrusion 322. In the non-limiting embodiment shown in FIG. 3A, the protrusion 322 includes a hemispherical boss shape. In other embodiments, a protrusion of overlay 320 may include virtually any shape. When mechanically coupled to IS device 310, the surfaces of protrusion 322 may be displaced from the active surface 312. Note however that the displaced surfaces of protrusion 322 are still within the proximate-distance threshold of active surface 312 when mechanically coupled to and/or interfacing with IS device 310.

Overlay 320 may be constructed from plastic, a glass, or another material that is at least partially transparent to the hover-sensing abilities of IS device 310. For instance, overlay 320 may be constructed via molded plastic or a tempered glass. Plastics may include, but are not limited to a polyethylene (PET) plastic or a thermoplastic polyurethane (TPU) plastic. In at least one embodiments, overlay 320 may include capacitive sensors to detect and/or sense the user's touch of surfaces of overlay 320. In such embodiments, overlay may generate and provide interaction to IS device 320 via a wired and/or wireless data transceiver interface. Thus, overlay 320 may not be required to be transparent to the hover-sensing abilities of IS device 310.

As such, IS device 310 is enabled to detect (and generate interaction data in response to the detection of) when the user touches or positions one or more fingertips on the surfaces of the overlay 320, such as but not limited to the displaced surfaces (relative to active surface 312) of protrusion 322. As such, IS device 310 may sense the hover gestures of a user, while the surfaces of overlay 320, such as but not limited to the surfaces of protrusion 322, provide the user tactile feedback for user-interactions with a VO. That is, the user may experience tactile feedback while interacting with a VO via 3D hover gestures detected with IS device 310.

Figure 3B:
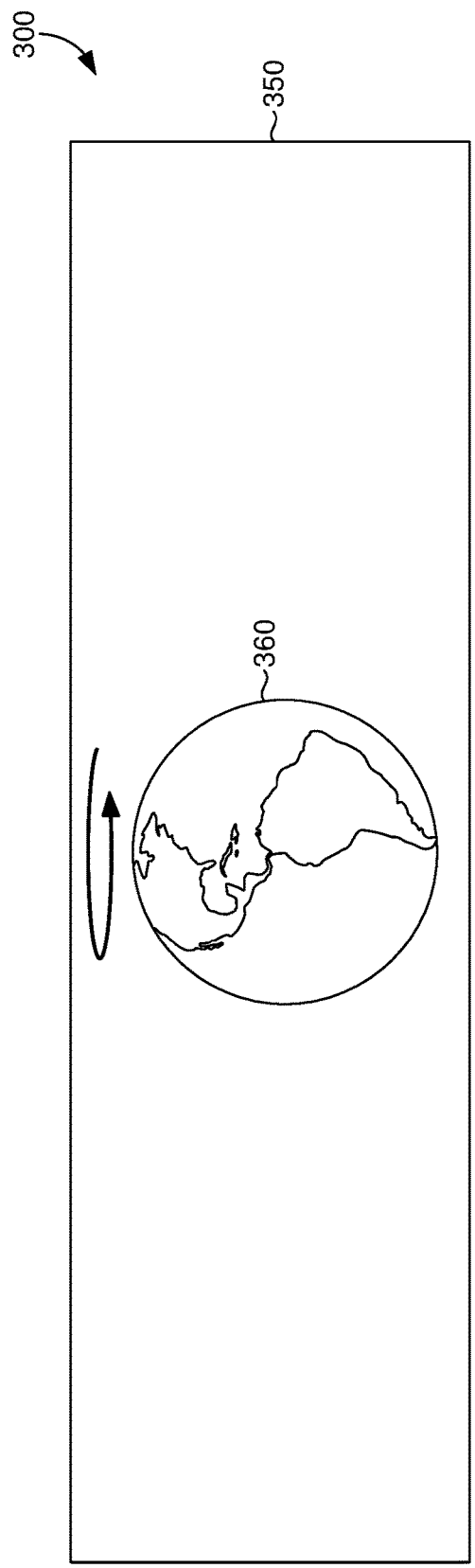
FIG. 3B is a schematic showing of an exemplary embodiment of a user employing the mechanically coupled overlay and interaction-sensing device of FIG. 3A to update a rotational orientation of a virtual object, in accordance with some embodiments of the present disclosure.
Figure 3B:
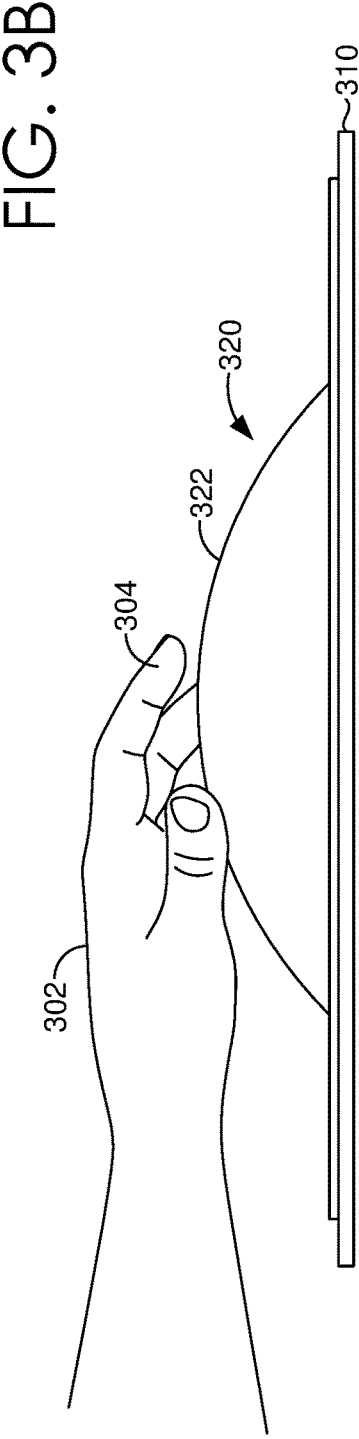

FIG. 3B is a schematic showing of an exemplary embodiment of a user employing the mechanically coupled overlay 320 and IS device 310 of FIG. 3A to update a rotational orientation of VO 360, in accordance with some embodiments of the present disclosure. More particularly, FIG. 3B shows user's hand 302 performing hover gestures via fingertips 304 touching the displaced surfaces of hemispherical boss-shaped protrusion 322. FIG. 3B also shows FOV 350 provided via a HMD device.

FOV 350 includes a VO 360, which is a hologram of Earth. The user may interact with VO 360 (or any other VO) via 3D hover gestures with fingertips 304 in contract with surfaces of protrusion 322. For instance, the user may manipulate, modify, or update a rotational orientation of VO 360 by gliding fingertips 304 or the palm of hand 302 over the hemispherical surfaces of protrusion 322. In another embodiment, the user may rotate a viewpoint of FOV 350 (i.e. rotate a position of viewer within the IE) based on hover gestures with their fingers in contact with the protrusion 322. In still other embodiments, the user may employ the hemispherical surfaces of protrusion 322 as a "trackball"-like control element for the interactions with VO 360. Thus, when interacting with VO 360, the user experiences tactile feedback via the physical sensation of fingertips 304 in physical contract with surfaces of protrusion 322.

In various embodiments, at least a portion of the surfaces of the overlay may be constructed from a softer material, such as a pliable or malleable material that the user may at least slightly deform via pressure from there touch. For instance, the upper portion of protrusion 322 may be constructed from such a softer material, while the lower portion is constructed from a harder or less pliable material, e.g., the upper portion may be overlaid with a putty or soft rubber-type material. The contrast in the hardness of the materials may provide additional tactile feedback, variances in friction, or otherwise constrain the movement of the fingers.

The constraints may be defined via furrows in the hard and/or soft materials. In at least one embodiment, at least a portion of the protrusion may be deformable, e.g., the protrusion may include an inflatable portion or otherwise be deformable via a mechanical device. As discussed herein, haptic feedback may be selectively provided via the harder and softer surfaces. For instance, an overlay may include one or more haptic feedback interface. The haptic feedback interface associated with the softer surfaces may be activated and/or operated separately from the haptic feedback interfaces of the harder surfaces.

Although not shown in FIG. 3B, overlay 320 may include mechanical, (e.g., movable parts), and/or protrusions. Overlay 320 may include one or more active parts, such as but not limited to switches, dials, levers, buttons, joysticks, trackballs, clickable devices, and the like. User interaction with such active devices may enable the generation of signals that are employed to control and/or manipulate one or more VOS, such as VO 36 of FIG. 3B.

Although FIG. 3B shows a single overlay 320 couple to IS device 310, it should be noted that multiple overlays may be coupled to IS device 310. For instance, a first coupled overlay may cover a first portion of the active surface 312 of IS device and a second coupled overlay may cover a second portion of the active surface 312. It should be understood that there is not an upper bound in the number of overlays that may be coupled to IS device 110. Each of the overlays separate protrusions. That is, each of the multiple overlays may include differently shaped protrusions.

Figure 4A:
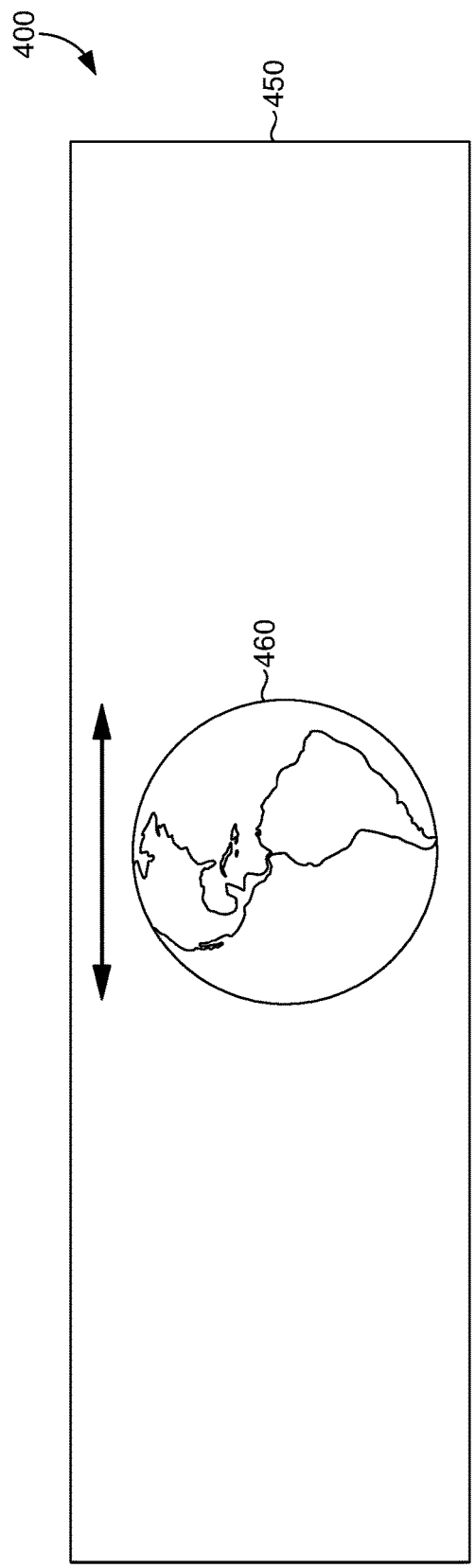
FIG. 4A is a schematic showing of an exemplary embodiment of a user employing a interaction-sensing device and another mechanically coupled overlay to update a position of a virtual object, in accordance with some embodiments of the present disclosure.
Figure 4A:
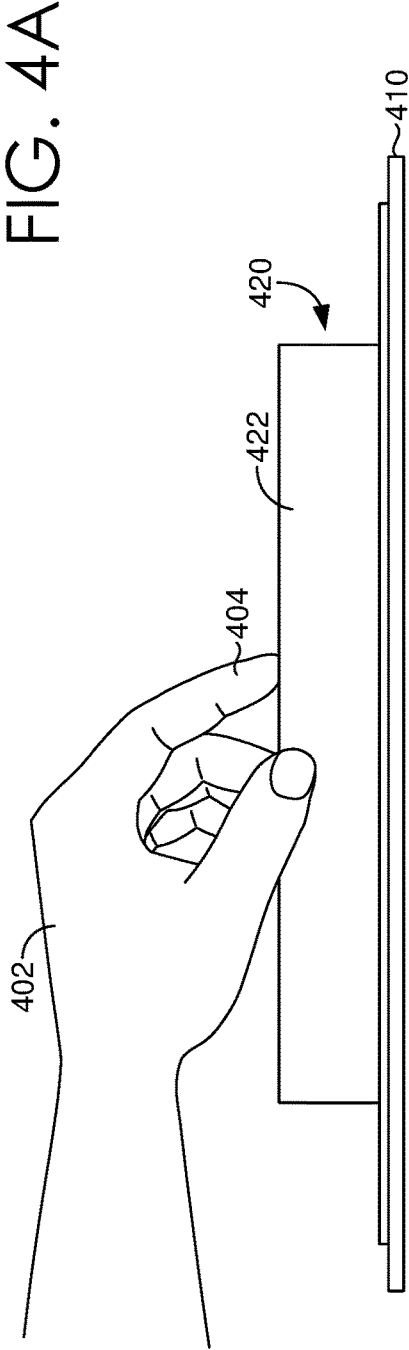

FIG. 4A is a schematic showing of an exemplary embodiment of a user employing IS device 410 and another mechanically coupled overlay 420 to update a position of VO 460, in accordance with some embodiments of the present disclosure. In contrast to the hemispherical boss-shaped protrusion 322 of overlay 320 of FIGS. 3A-3B, overlay 420 of FIG. 4A includes a parallelepiped-shaped protrusion 422. Similar to protrusion 322, the displaced surfaces of protrusion 422 are within the proximate-distance threshold of an actual surface of IS device 410. Thus, IS device 410 may detect hover gestures when fingertips are in contact with the surfaces of overlay 420, including the displaced surfaces of protrusion 422. FIG. 4A shows the user executing hover gestures via fingertips 404 of user's hand 402 being within physical contact with and gliding over the displaced surfaces of protrusion 422.

FIG. 4A also shows FOV 450, provided via a HMD device communicatively coupled to IS device 410. FOV 450 includes VO 460, which is a hologram of Earth. By gliding fingertips 404 over protrusion 422, the user may perform hover gestures to interact with VO 460. Furthermore, the surfaces of protrusion 422 provides tactile feedback to the user. For instance, the user may translate, update, modify, or otherwise manipulate the position or location of VO 360 within FOV 450. The spatial direction of the translation may be based on the particular planar surface of the parallelepiped-shaped protrusion 422 the user glides fingertips 404 over. For instance, some of the surfaces of protrusion 422 lie within the x-y place, other surfaces of protrusion lie within the x-z plane, and other surfaces lie within the y-z plane. Thus, different shapes of a protrusion included in an overlay can provide different user-interactions with various VOs.

Figure 4B:
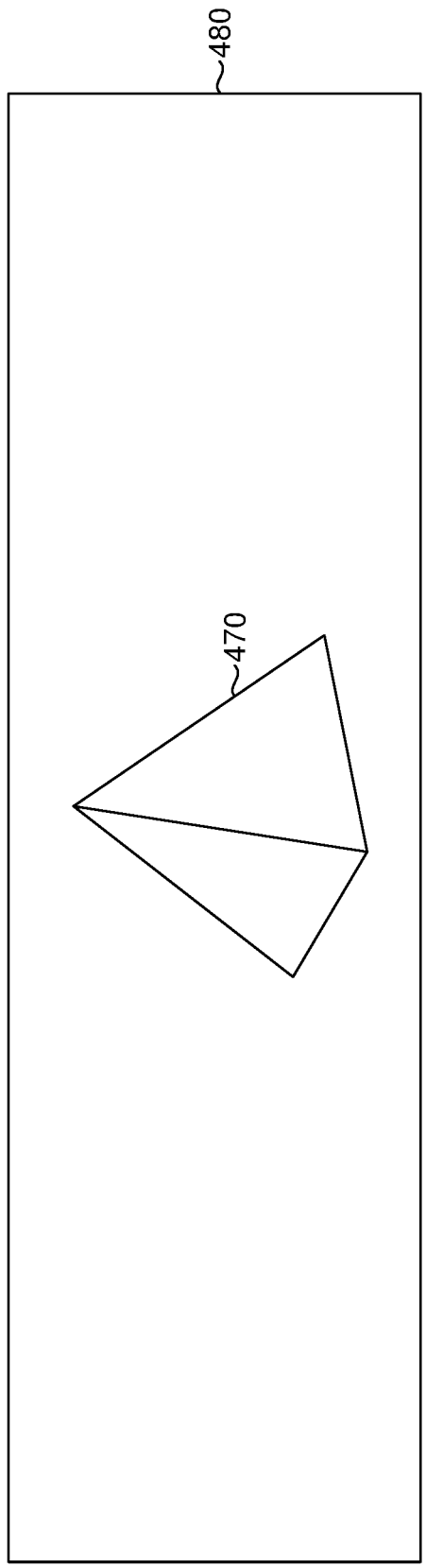
FIG. 4B is a schematic showing of an exemplary embodiment of a user employing the interaction-sensing device of FIG. 4A and another mechanically coupled overlay to generate a virtual object within an immersive environment, in accordance with some embodiments of the present disclosure.
Figure 4B:
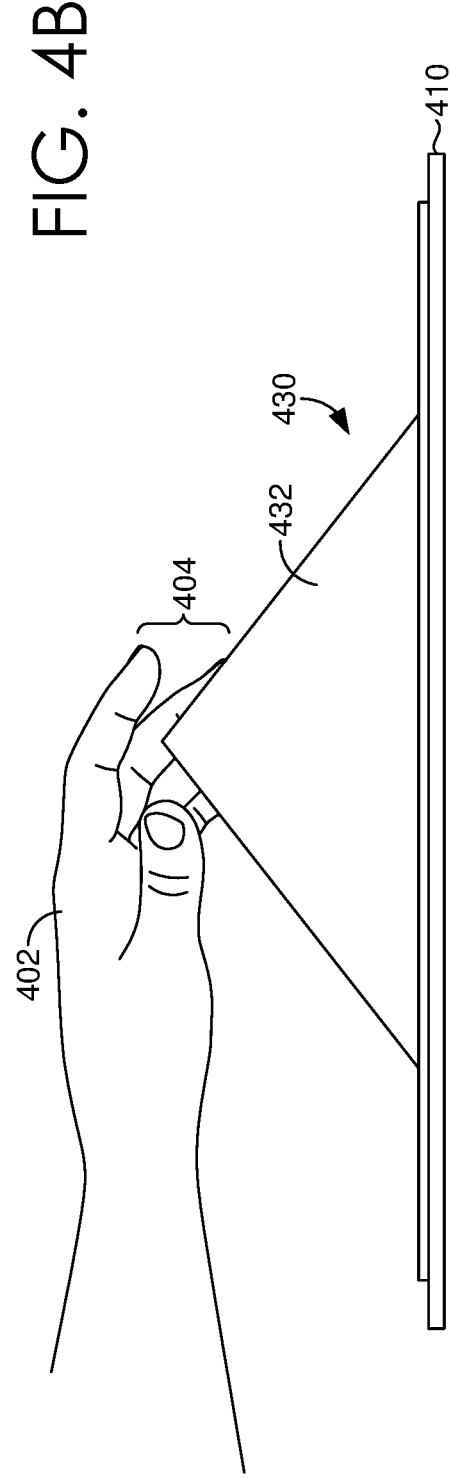

FIG. 4B is a schematic showing of an exemplary embodiment of a user employing the interaction-sensing device of FIG. 4A and another mechanically coupled overlay to generate a virtual object within an immersive environment, in accordance with some embodiments of the present disclosure. Overlay 430 has been mechanically couple or interfaces with ID device 410. Overlay includes a pyramid-shaped protrusion 432. Fingertips 403 of user's hand 402 is shown gliding over the surfaces of pyramid-shaped protrusion 432. In response to such hover gestures, IS device generates interaction data encoding the positions and/or motion of fingertips 402 as fingertips glide over the surfaces of protrusion 432.

FIG. 4B also shows FOV 480, provided via a HMD device communicatively coupled to IS device 410. In some embodiments, a shape of protrusion 432 may automatically be determined based on the interaction data. For instance, either the IS device or the HMD device may determine the shape (i.e. a pyramid) of protrusion 432 based on the encoded positions and motion of fingertips 402 gliding over protrusion 432. It should be noted that embodiments are not limited to determining the shape of a protrusion included in an overlay. That is, a user could hold discrete (i.e. not integrated with overlay 43) physical object (such as but not limited to a ball or a block) over the active surface of IS device 410. For instance, the user may remove overlay 430. The interaction data generated by the user manipulating the physical object (i.e. hover gestures), over the hover-sensing active surface of IS device 410, may be employed to determine the shape of the manipulated physical object.

The HMD device may update FOV 480 based on the determined shape of protrusion 432 (or another discrete physical object) and/or the interaction data that is used to encode the hover gestures of the user. In one non-limiting embodiment, FOV 480 may be updated to include a hologram or other visualization of a VO of the determined shape. For example, FOV 480 has been updated and/or modified to include VO 470, based on the determined pyramid shape of protrusion 432.

Furthermore, a unique identifier associated with overlay 430 may automatically be determined based on the determined shape of protrusion 432. In other embodiments, IS device 410 may be enabled to automatically determine and/or detect the unique identifier associated with overlay 430. For instance, IS device may include various sensors, such as but not limited to optical scanners, cameras, touch-sensitive sensors, radios, and the like that may automatically detect the mechanically coupling of overlay 430 with IS device 410. Such sensors may detect and optically scannable code, a radio-frequency identification (RFID) tag, or the like that is uniquely associated with the unique identifier associated with overlay 430.

In various embodiments, the unique identifier may be encoded in the interaction data provided to the HMD device. An operating mode of the HMD device may be updated based on the identifier. For instance, the various user-interactions provided to a user may be updated based on the identifier associated with the overlay. In other embodiments, the operating mode may be updated based on the automatically determined shape of the protrusion or the discrete physical object.

Figure 5:
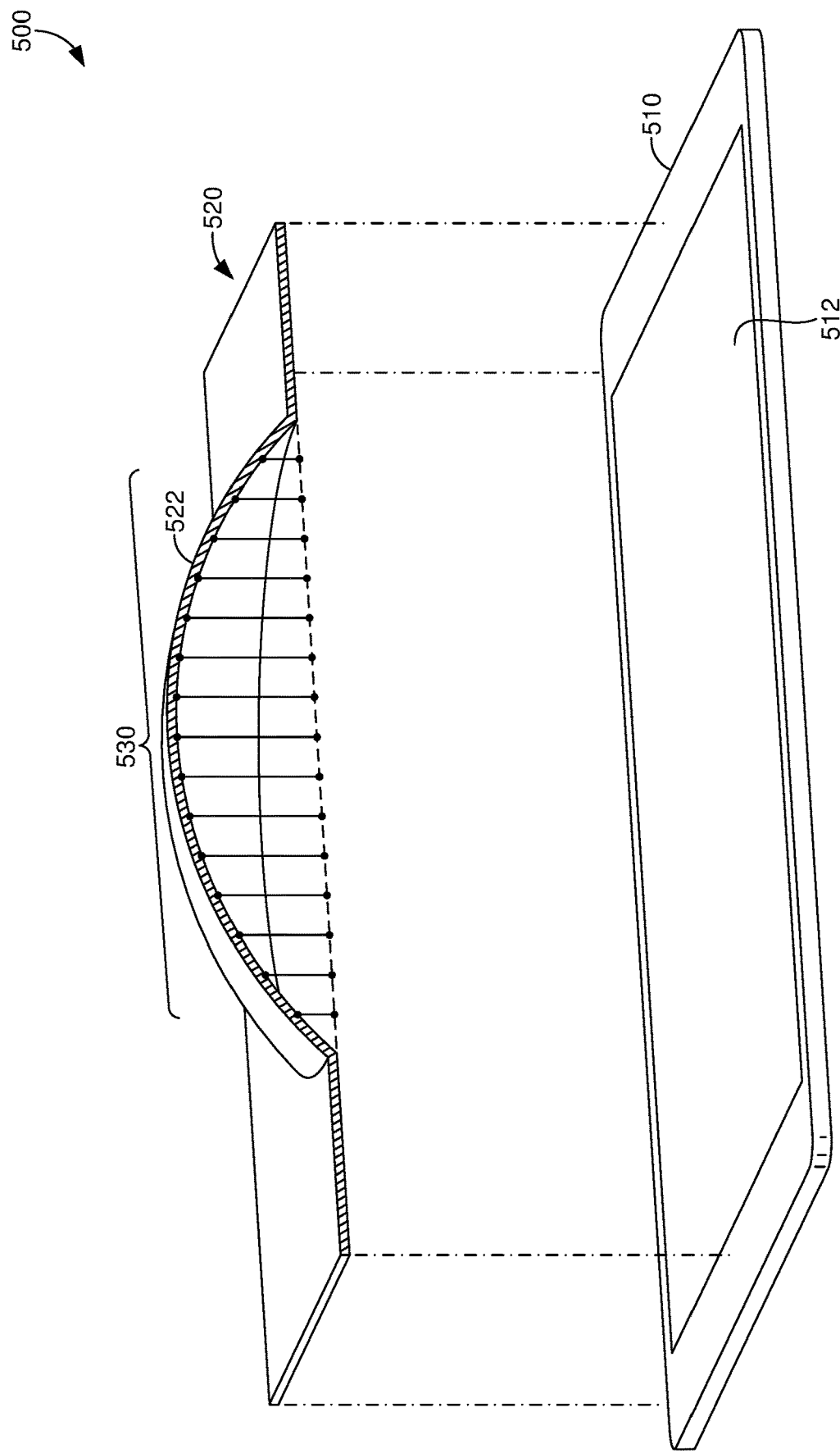
FIG. 5 is a schematic showing of an exemplary step of mechanically coupling an overlay that includes a three-dimensional surface and capacitive couplers with an interaction-sensing device that includes a two-dimensional capacitive-sensing surface, in accordance with some embodiments of the present disclosure.

FIG. 5 is a schematic showing of an exemplary step of mechanically coupling an overlay 520 that includes a 3D surface (i.e. protrusion 530) and a plurality of capacitive couplers 530 with an interaction-sensing device 510 that includes a 2D capacitive-sensing surface (i.e. touch-sensitive surface 512), in accordance with some embodiments of the present disclosure. In some embodiments, an IS device, such as but not limited to IS device 510, do not include an active surface that senses 3D hover gestures. Rather, IS device 510 includes a 2D touch-sensitive surface 512, that may be similar to the touch-sensitive display devices commonly employed in various mobile computing devices.

When overlay 520 is mechanically coupled to IS device 510, the plurality of capacitive couplers 530 can capacitively couple at least a portion of the points of the 3D surface of protrusion 530 with points on the 2D touch-sensitive surface 512. Thus, based on the 3D shape of protrusion 522 and the locations (on each of the protrusion 522 and touch-sensitive surface 512) of the capacitive couplers 530 and the locations of the corresponding points on the 2D touch-sensitive surface 512, a one-to-one correspondence map may be generated. That is, a one-to-one map between the points on the 3D surface of protrusion 522 and the corresponding points on the 2D touch-sensitive surface 512 may be generated. In some embodiments, the IS device is enabled to generate the one-to-one map. In at least one embodiments, the HMD device generates the one-to-one map.

Capacitive couplers 530 and the one-to-one correspondence map can enable the user performing 3D hover gestures along the surfaces of overlay 510 to 3D interact with a VO, employing an IS device that does not include hover-sensing capabilities. For example, a spherical overlay, may be used to rotate a 3D object in VR/AR while looking at it, and feeling the finger movement on the plastic protrusion.

Figure 6:
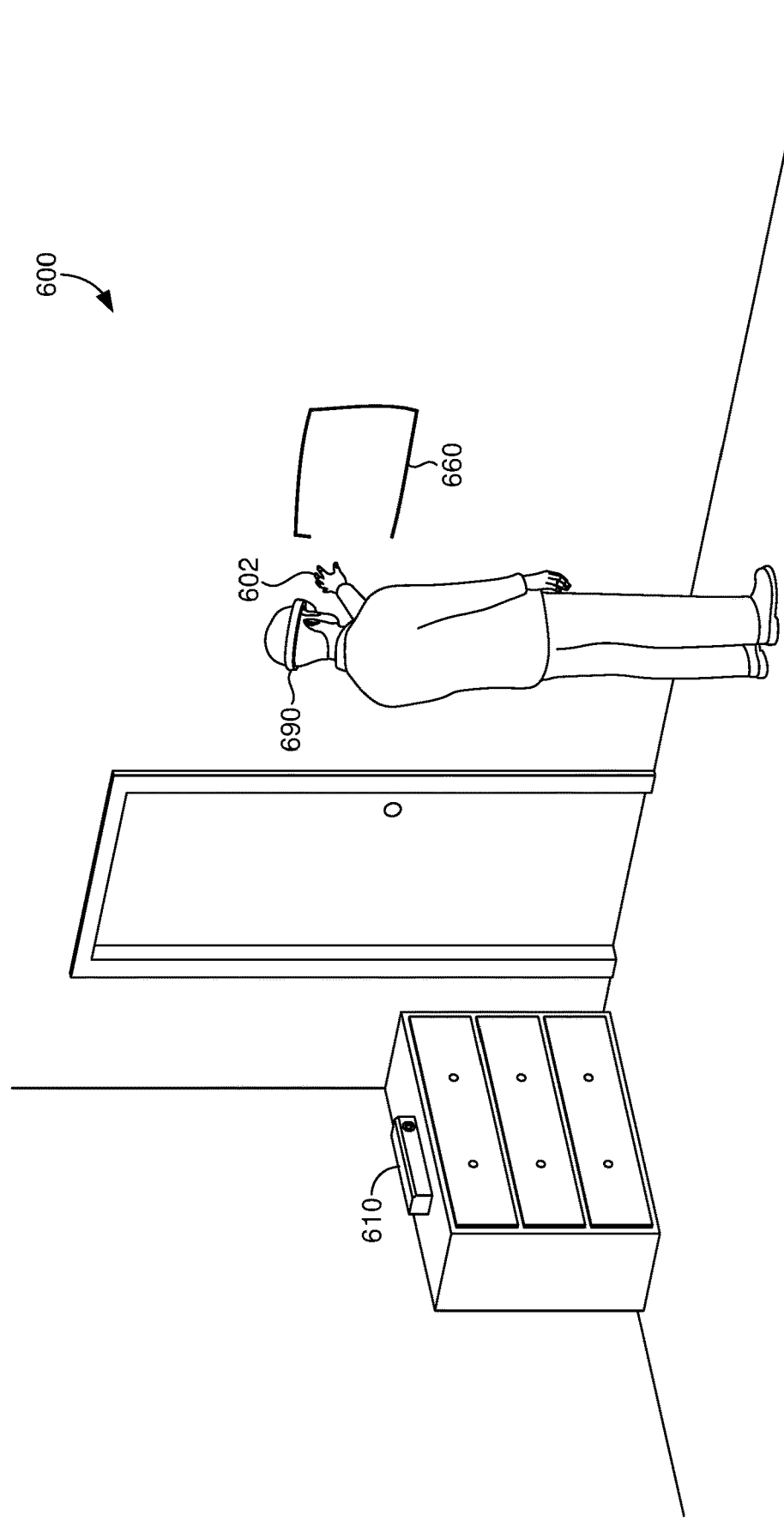
FIG. 6 is a schematic showing of an exemplary embodiment of a user employing camera system as an interaction-sensing device and a head-mounted display device to generate a virtual object within an immersive environment.

FIG. 6 is a schematic showing of an exemplary embodiment of a user employing camera system 610 as an IS device and a HMD device 690 to generate a virtual object within an immersive environment (IE). More particularly, camera system 610, within room 600 may include one or more camera devices that track, sense, or detect the free-space gestures of the user's hand 602. For instance, camera system 610 may be a component of a video gaming console and/or entertainment system. Camera system 610 may generate interaction data encoding the free-space gestures of user's hand 602 and/or fingertips.

Camera system 610 may be communicatively coupled, via a communication session, to HMD device 690. HMD device 690 may be an AR and/or a MR enabled HMD device, such as those discussed in conjunction with HMD device 140 of FIG. 1 and/or HMD device 902 of FIG. 9. In response to the received interaction data, the HMD device 610 update and/or modify the displayed FOV. For instance, HMD device 610 may generate a VO (e.g. the rectangular object 660) within the FOV.

Figures 7, 8:
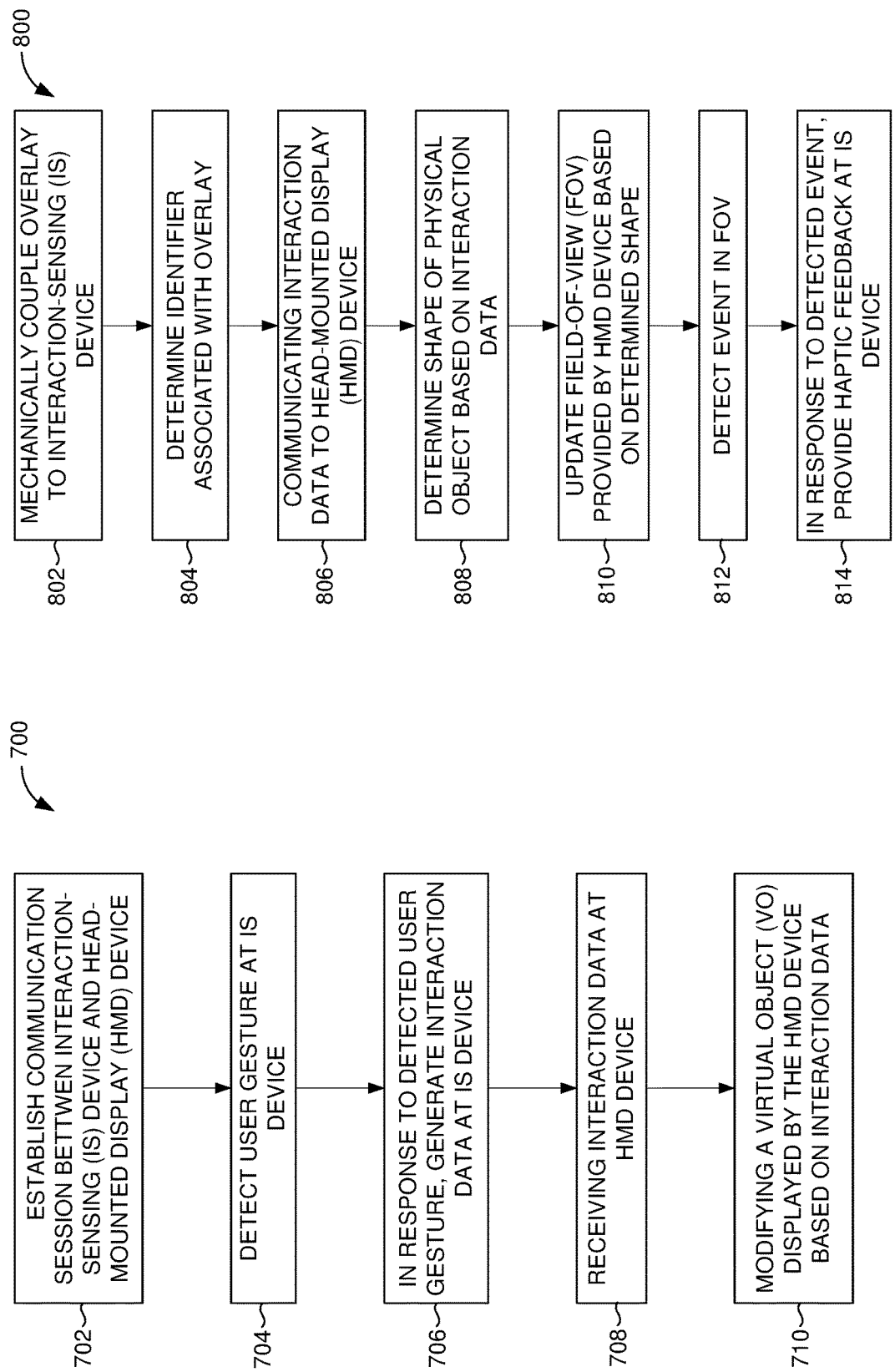
FIG. 7 is a flow diagram showing of an exemplary embodiment of a method for enabling user-interactions with virtual objects, in accordance with some embodiments of the present disclosure.
FIG. 8 is a flow diagram showing of another exemplary embodiment of a method for enabling user-interactions with virtual objects, in accordance with some embodiments of the present disclosure.

Referring now to FIG. 7 in light of FIGS. 1-6, FIG. 7 is a flow diagram showing of an exemplary embodiment of a method for enabling user-interactions with virtual objects, in accordance with some embodiments of the present disclosure. Each block of method 700 and other methods and/or processes described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Initially, at block 702, a communication session is established between an IS device and a HMD device. In some embodiments, the HMD device is enabled to initiate and establish the communication session. In other embodiments, the IS device initiates and establishes the communication session. In some non-limiting embodiments, the communication session is a peer-to-peer (P2P) communication session, but need not be. At any rate, via block 702, the IS device and the HMD device are communicatively coupled and/or are in communication.

The IS device may be a hover-sensing (HS) device, a touch and hover device, a touch sensing device, a camera system, or any of the other various embodiments of IS devices discussed herein. The HMD device may be an AR HMD device, a VR HMD device, a MR HMD device, or the like.

At block 704, the IS device detects one or more user gestures. For instance, the IS device may detect 2D and/or 3D gestures such as hover gestures, free-space hand gestures, fingertip gestures, multi-fingertip gestures, touch gestures, and the like. At block 706, and in response to the detected user gestures, the IS device generates interaction data encoding the user gestures.

At block 708, at least a portion of the interaction data is received at or by the HMD device. In some embodiments, the interaction data is received directly from the other IS device, via the communication session. That is, the IS device provides and/or communicates the interaction data to the HMD device via the communication session. In other embodiments, the interaction data is received via another computing device that is communicatively intermediate the IS device and the HMD device.

At block 710, a VO included in a FOV provided by the HMD device is modified and/or updated based on the generated interaction data. The modification to the VO may include virtually any modification to provide a visualization and/or other indication of the user interacting with the VO. For instance, the user may select, control, edit, rotate, translate, move, reposition or otherwise manipulate the VO. For instance, a rotational orientation or a position of the VO may be updated based on the interaction data. In some embodiments, the FOV may be updated and/or modified to change the color, contrast, or brightness of a background or one or more VOs included in the FOV. In various embodiments, the viewpoint (e.g. a position of the viewer's perspective) of the FOV may be updated at block 710. In some embodiments, the FOV may be updated to include the generation of new VOs and/or the multiplication and/or reproduction of VOs already included in the FOV.

In at least one embodiment, the interaction data encodes a selection of a planar slice or a layer of a 3D VO. At block 708 or block 710, the planar slice of the VO may be correlated with a touch-sensitive surface of the IS device. For instance, the selected planar slice may be "pinned" to the touch-sensitive surface. The IS device may generate additional interaction data, in response to the user executing touch gestures on the touch-sensitive device. Upon receiving the additional interaction data, the HMD device may modify and/or update the VO based on the additional interaction data.

FIG. 8 is a flow diagram showing of another exemplary embodiment of a method 800 for enabling user-interactions with virtual objects, in accordance with some embodiments of the present disclosure. Initially, at block 802, an overlay is mechanically coupled to an IS device. The IS device may be communicatively coupled to a HMD device, as discussed in conjunction with at least method 700 of FIG. 7. One or more surfaces of the overlay (e.g. surfaces of a 3D protrusion) may be displaced from a hover sensing active surface of the IS device. The IS device may generate interaction data in response to detecting the user touching the one or more displaced surfaces (e.g. a protrusion).

At block 804, an identifier associated with the overlay may be automatically determined by at least one of the IS device or the HMD device. For instance, the identifier may be automatically determined via an RFID tag, an optically scannable code, object recognition features, or the like. In at least one embodiment, the identifier is automatically determined based on interaction data generated from the user gliding (or touching) their fingertips over one or more protrusions of the overlay.

At block 806, interaction data may be communicated to the HMD device. In addition to user gestures, the interaction data may encode the identifier of the overlay. An operating mode of the HMD device may be updated and/or modified based on the identifier. At block 808, a shape of a physical object is determined based on interaction data. For instance, the physical object may be a protrusion of the overlay and/or a discrete physical object that is separate from the overlay. The interaction data may be generated based on hover gestures of the user manipulating the physical object. The determination of the shape may be performed at the IS device or the HMD device.

At block 810, the FOV provided by the HMD device is updated and/or modified based on the determined shape. For instance, a VO may be generated within the FOV, wherein the shape, color, position, rotational orientation, or the like of the VO is based on the determined shape and/or generated interaction data. At block 812, an event is detected in the FOV. For instance, the event may include an event within a gaming or simulation application (e.g., a collision of a user controlled VO with another VO included in the IE). At block 814, and in response to the detected event, haptic feedback is provided at the IS device. For instance, a haptic-feedback interface of the IS device may be employed to provide haptic feedback to the user operating the IS device.

Figure 9:
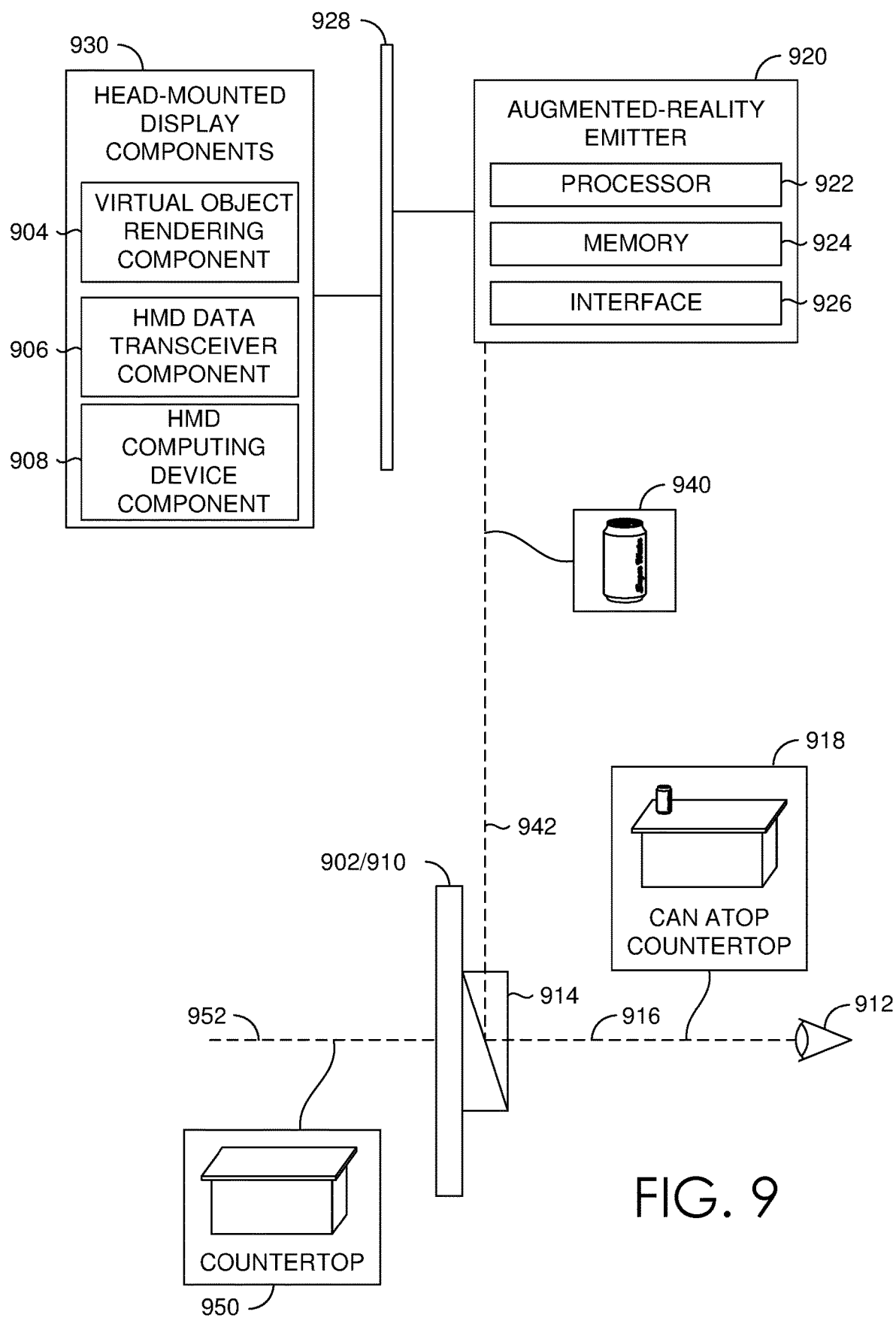
FIG. 9 is a block diagram of an exemplary head-mounted display device, in accordance with some embodiments of the present disclosure.

Turning to FIG. 9, a mixed-reality (MR) and/or augmented-reality (AR) HMD device 902 for augmented reality (AR) and MR applications having, among other things, a virtual object rendering component 904, a HMD data transceiver component 906, and an HMD computing device component 908, is described in accordance with an embodiment described herein. The HMD device 902 includes a see-through lens 910 which is placed in front of a user's eye 912, similar to an eyeglass lens. It is contemplated that a pair of see-through lenses 910 can be provided, one for each eye 912. The lens 910 includes an optical display component 914, such as a beam splitter (e.g., a half-silvered mirror). The HMD device 902 includes an augmented-reality emitter 920 that facilitates altering the brightness of augmented-reality images. Amongst other components not shown, the HMD device also includes a processor 922, memory 924, interface 926, a bus 928, and additional HMD components 930. The augmented-reality emitter 920 emits light representing an augmented-reality image 940 exemplified by a light ray 942. Light from the real-world scene 950, such as a light ray 952, reaches the lens 910. Additional optics can be used to refocus the augmented-reality image 940 so that it appears to originate from several feet away from the eye 912 rather than one inch away, where the display component 914 actually is. The memory 924 can contain instructions which are executed by the processor 922 to enable the augmented-reality emitter 920 to perform functions as described. One or more of the processors can be considered to be control circuits. The augmented-reality emitter communicates with the additional HMD components 930 using the bus 928 and other suitable communication paths. The augmented-reality image 940 is reflected by the display component 914 toward a user's eye, as exemplified by a light ray 916, so that the user sees an image 918. In the image 918, a portion of the real-world scene 950, such as, a countertop is visible along with the entire augmented-reality image 940 such as a can. The user can therefore see a mixed-reality image 918 in which the can is sitting atop the countertop in this example.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 10:
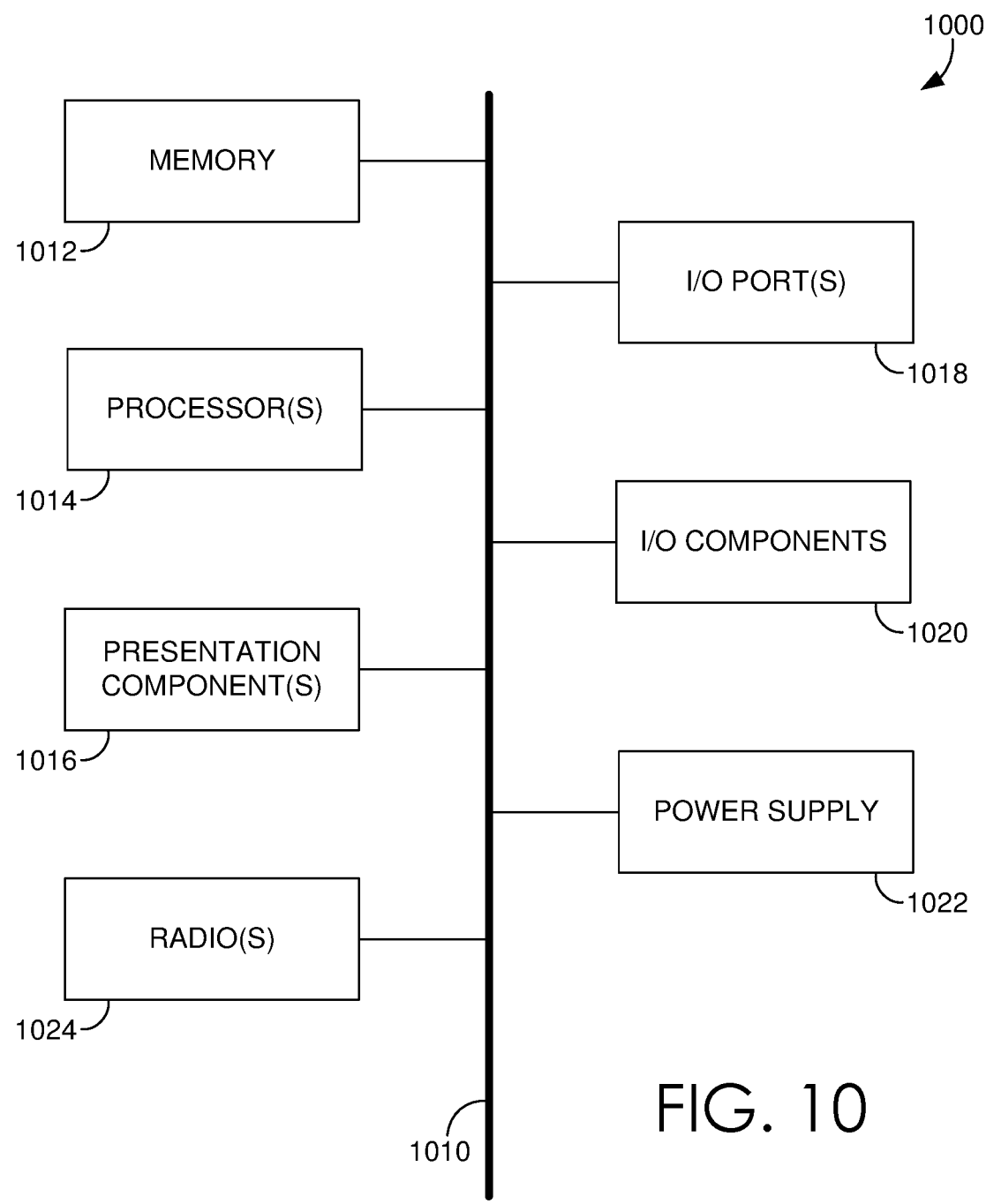
FIG. 10 is a block diagram of an exemplary computing environment suitable for use in implementing embodiments of the present disclosure.

Having described embodiments of the present invention, an exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or another handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output ports 1018, input/output components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and another wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or another device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

Accordingly, in one embodiment described herein, a method for enabling user-interactions with virtual objects (VOs). The method may include establishing, by a head-mounted display (HMD) device, a communication session with an interaction-sensing (IS) device. The HMD device displays, to a user, a field of view (FOV) that includes the virtualized object. The IS device is separate from the HMD device and is configured to detect user-interactions including a user extremity position relative to the IS device. The method may further include receiving from the IS device, via the established communication session, interaction data generated in response to a detected user extremity position relative to the IS device. Additionally, the method can include modifying the virtualized object included in the FOV based on the received interaction data.

The IS device may be a touch and hover (TAH) device. The TAH device is configured to detect a touch of the user extremity on a first surface of the TAH device. The TAH device is also configured to detect a distance between the first surface and the user extremity when the user extremity is displaced from the first surface. In other embodiments, the IS device is a hover-sensing (HS) device. In some embodiments, the IS device includes a touch-sensitive device, such as but not limited to a touch-sensitive display device.

The device may be further configured to mechanically couple with an overlay. When coupled, the overlay presents at least a portion of a second surface displaced from the first surface of the IS device. The IS device further generates the interaction data in response to a user extremity touch detected on the second surface. In at least one embodiment, the IS device and/or the HMD device is configured to automatically determine an identifier associated with the mechanically coupleable overlay for the IS device. The method may update an operating mode of the HMD device, based on the identifier. For instance, the identifier may be encoded in a portion of the interaction data provided to the HMD device.

The IS device may be configured to generate the interaction data in response to a motion of the user extremity detected along one or more surfaces of a physical object. For instance, the object may be a protrusion or shape included in the overlay. In other embodiments, the physical object may be another physical object that is not part of the over. A shape of the physical object, such as the protrusion or another discrete physical object, may be automatically determined (by either the IS device and/or the HMD device) based on interaction data generated in response to the motion of the user extremity detected along one or more surfaces of a physical object. The HMD device may update the FOV based on the determined shape. For instance, a hologram or other VO may be generated within the FOV that depicts a 2D or 3D visualization of the shape.

In some embodiments, the HMD device may update a rotational orientation of a VO included in the FOV based on interaction data that encodes detected motion of the user extremity along one or more surfaces of a physical object, such as but not limited to a protrusion of the overlay, or another separate physical object. The IS device may include multiple camera devices configured to detect at least a portion of the user-interaction.

The interaction data may encode a user-selection of a planar slice (or layer) of a VO. In such embodiments, the method further includes correlating, by the HMD device, the planar slice of the VO with a touch-sensitive surface of the IS device. The IS device is further configured to generate additional interaction data in response to a user extremity touch detected on the touch-sensitive surface. The HMD device receives, via the communication session, the generated additional interaction data communicated from the IS device. The HMD device modifies, the planar slice of the virtualized object included in the FOV based on the received additional interaction data.

In various embodiments, the IS device is configured to generate the interaction data in response to a motion of the user extremity detected along one or more surfaces of a protrusion included on an overlay that is mechanically coupled to the IS device. The HMD device is enabled to update a position of the virtualized object within in the FOV based on the received interaction data that encodes the motion of the user extremity.

In some embodiments, the IS device is configured to provide the user with haptic feedback in accordance with an event within the FOV. For instance, in gaming applications, the haptic-feedback interface included in the IS device may provide the user with haptic feedback.

In at least one embodiment, the IS device includes a two-dimensional (2D) capacitive-sensing surface. For instance, the IS device may include a 2D touch-sensitive surface such as but not limited to a touch-sensitive display device. Such IS devices are configured to interface with an overlay that includes a three-dimensional (3D) surface. For instance, the 3D surface may be a protrusion. The overlay may also include a plurality of capacitive couplers that capacitively couple portions of the 3D surface and portions of the 2D capacitive-sensing surface when the IS device interfaces with the overlay. A one-to-one map between the capacitively coupled portions of the 3D surface and the portions of the 2D capacitive-sensing surface may be generated. The IS device generates interaction data in response to a user extremity touch detected on the 3D surface. The HMD device updates a 3D aspect of the virtualized object based on the received interaction data and the generated one-to-one map.

The IS device or the HMD device may automatically determine a 3D contour of the protrusion or 3D surface of the overlay based on interaction data. The interaction data may be generated in response to the user touching or gliding their fingers along the 3D surfaces. The HMD device may generate another VO for display within the FOV. The shape of the VO is based on the determined 3D contour of the protrusion.

In another embodiment described herein, one or more computer storage media having computer-executable instructions embodied thereon that, when executed, by one or more processors, causing the one or more processors to execute operations for enabling user-interactions with virtual objects rendered in an immersive environment, is provided. For instance, the storage media may include non-transitory media. The operations include establishing, by a touch and hover (TAH) device, a communication session with a head-mounted display (HMD) device. The HMD device is configured to display, to a user, a field of view (FOV) that includes the virtualized object.

The operations may further include generating, by the TAH device, interaction data in response to three-dimensional (3D) motion of a user extremity detected by the TAH device. The generated interaction data may be communicated to the HMD device, via the established communication session. The HMD device is configured to modify the VO included in the FOV based on the communicated interaction data.

In some embodiments, the operations may further include receiving, via a mechanical coupling, an overlay for the TAH device. The overlay may include a protrusion. The TAH device is enabled to generate the interaction data in response to 3D motion of the user extremity detected along one or more surfaces of the overlay protrusion. The overlay protrusion includes at least one of a curved boss, a parallelepiped, a cylinder, or a pyramid.

In some embodiments, the HMD is configured to update a viewpoint of the FOV or a position of the VO based on a portion of the communicated interaction data that encodes the 3D motion of the user extremity detected along one or more surfaces of a protrusion coupled to the TAH device.

In various embodiments, the operations further include determining, by the TAH device, a shape of a protrusion coupled thereto. The determination of the shape is based on a portion of the generated interaction data that encodes at least a portion of the 3D motion of the user extremity detected along one or more surfaces of the protrusion. The HMD device may be configured to update the FOV based on the determined shape of the protrusion.

In yet another embodiment described herein, a system for enabling user-interactions with a VO in an immersive environment is provided. The system includes a physical overlay. The physical overlay presents a three-dimensional (3D) protrusion. The physical overlay is coupleable to an interaction-sensing (IS) device. The 3D protrusion is displaced from a two-dimensional (2D) interaction-sensing surface of the IS device. For instance, the 2D interaction-sensing surface may be a touch- or capacitive-sensing surface commonly employed in mobile devices such as but not limited to smartphones and tablets. The physical overlay is coupled to the IS device. The IS device is configured to generate interaction data in response to at least a user extremity touch detected on the 3D protrusion when coupled to the physical overlay. A head-mounted display (HMD) device is in communication with the IS device. The HMD device may be configured to update a field of view (FOV) displaying the virtualized object based on at least a portion of the generated interaction data received from the IS device.

In some embodiments, the IS device may be a touch and hover (TAH) device. The TAH device is configured to generate interaction data in further response to a user extremity hover-gesture detected over a portion of the 2D interaction-sensing surface. The physical overlay includes a plurality of capacitive couplers that are capacitively coupleable to portions of the 2D interaction-sensing surface when the physical overlay is coupled to the IS device. At least one of the IS device and/or the HMD device is configured to generate a one-to-one map between portions of the physical overlay and portions of the 2D interaction-sensing surface. The HMD device is further configured to update a 3D aspect of the virtualized object based on the received interaction data and the generated one-to-one map.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a head-mounted display unit; however, the head-mounted display unit depicted herein is merely exemplary. Components can be configured for performing novel aspects of embodiments, where configured for comprises programmed to perform particular tasks or implement particular abstract data types using code. Further, while embodiments of the present invention may generally refer to the head-mounted display unit and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for enabling user-interactions with a virtualized object, the method comprising:
    establishing, by a computing device, a communication session with an interaction-sensing (IS) device, wherein a head-mounted display (HMD) device coupled to the computing device is configured to display a field of view (FOV) that includes the virtualized object, and wherein the IS device is separate from the HMD device and is configured to detect user-interactions including a user extremity position relative to the IS device;
    receiving, by the computing device, interaction data via the established communication session in response to a detected motion of the user extremity along one or more surfaces of a physical object, wherein the motion is relative to the IS device;
    modifying, by the computing device, the virtualized object included in the displayed FOV based on a shape of the physical object, the shape being determined based on at least a portion of the received interaction data that encodes the detected motion of the user extremity.

2. The computer-implemented method of claim 1, wherein the IS device is a touch and hover (TAH) device that is configured to detect a touch of the user extremity on a first surface of the TAH device, and further detect a distance between the first surface and the user extremity when the user extremity is displaced from the first surface.

3. The computer-implemented method of claim 2, wherein the IS device is further configured to mechanically couple with an overlay that presents at least a portion of a second surface that is included in the one or more surfaces of the physical object and displaced from the first surface of the IS device, and generate the interaction data in response to a user extremity touch detected on the second surface.

4. The computer-implemented method of claim 1, wherein the IS device is further configured to determine an identifier associated with a mechanically coupleable overlay for the IS device that includes the physical object; and
    update, by the computing device, an operating mode of the HMD based on the determined identifier of the overlay.

5. The computer-implemented method of claim 1, wherein the IS device is further configured to provide the user with haptic feedback in accordance with an event within the FOV.

6. The computer-implemented method of claim 1, wherein the interaction data encodes the detected motion of the user extremity along one or more surfaces of the physical object, and the method further comprises:
    updating, by the computing device, a rotational orientation of the virtualized object included in the displayed FOV based on at least a portion of the received interaction data that encodes the detected motion of the user extremity.

7. The computer-implemented method of claim 1, wherein the IS device includes a plurality of camera devices configured to detect at least a portion of the user-interactions.

8. The computer-implemented method of claim 1, wherein the generated interaction data encodes a selection of a planar slice of the virtualized object; and
    correlating, by the computing device, the planar slice of the virtualized object with a touch-sensitive surface of the IS device, wherein the IS device is further configured to generate additional interaction data in response to a user extremity touch detected on the touch-sensitive surface;
    receiving by the computing device the generated additional interaction data communicated from the IS device via the communication session; and
    modifying, by the computing device, the planar slice of the virtualized object included in the displayed FOV based on the received additional interaction data.

9. The computer-implemented method of claim 1, wherein the interaction data encodes the detected motion of the user extremity along one or more surfaces of the physical object, which includes a protrusion included on an overlay, wherein the overlay is mechanically coupled to the IS device; and
    updates, by the computing device, a position of the virtualized object included in the displayed FOV based on at least a portion of the received interaction data that encodes the motion of the user extremity.

10. The computer-implemented method of claim 1, wherein the IS device includes a two-dimensional (2D) capacitive-sensing surface, and
    wherein the IS device is further configured to:
    interface with an overlay that includes the one or more surfaces of the physical object and a plurality of capacitive couplers that capacitively couple portions of the one or more surfaces and portions of the 2D capacitive-sensing surface when the IS device interfaces with the overlay,
    generate a one-to-one map between the capacitively coupled portions of the one or more surfaces and the portions of the 2D capacitive-sensing surface; and
    update, by the computing device, a 3D aspect of the virtualized object included in the displayed FOV based on the received interaction data and the generated one-to-one map.

11. The computer-implemented method of claim 1, wherein the IS device is configured to mechanically couple with a 3D protrusion that includes the physical object, and further determine a 3D contour of the protrusion based on the shape of the physical object, and the method further comprises:
generating, by the computing device, another virtualized object for display within the displayed FOV, wherein a shape of the other virtualized object is based on the determined 3D contour of the protrusion.

12. One or more non-transitory computer storage media having computer-executable instructions embodied thereon that, when executed by one or more processors, causes the one or more processors to perform a method for enabling user-interactions with a virtualized object, the method comprising:
establishing, by a touch and hover (TAH) device, a communication session with a computing device coupled to a head-mounted display (HMD), wherein the computing device is configured to provide to the HMD for display a field of view (FOV) that includes the virtualized object and a protrusion is coupled to the TAH device;
generating, by the TAH device, interaction data in response to three-dimensional (3D) motion, detected by the TAH device, of a user extremity along one or more surfaces of the protrusion; and
communicating, by the TAH device, the generated interaction data to the computing device via the established communication session, wherein the computing device is further configured to modify the virtualized object included in the displayed FOV based on determining, by the TAH device, a shape of the protrusion based on at least a portion of the communicated interaction data that encodes the 3D motion of the user extremity along the one or more surfaces of the protrusion.

13. The one or more computer storage media of claim 12, the method further comprising:
receiving, via a mechanical coupling, an overlay for the TAH device, wherein the overlay includes the protrusion.

14. The one or more computer storage media of claim 13, wherein the overlay protrusion includes at least one of a curved boss, a parallelepiped, a cylinder, or a pyramid.

15. The one or more computer storage media of claim 12, wherein the computing device is further configured to update at least one of a viewpoint of the displayed FOV or a position of the virtualized object included in the displayed FOV based on at least the portion of the communicated interaction data that encodes the 3D motion of the user extremity along the one or more surfaces of the protrusion that is coupled to the TAH device.

16. A system for enabling user-interactions with a virtualized object, the system comprising: a physical overlay and an interaction-sensing (IS) device, wherein
the physical overlay presents at least one three-dimensional (3D) protrusion, and is coupleable to the IS device, wherein the at least one 3D protrusion is displaced from a two-dimensional (2D) interaction-sensing surface of the IS device when the physical overlay is coupled to the IS device,
the IS device is configured to
generate interaction data in response to at least a user extremity touch detected on the at least one 3D protrusion when coupled to the physical overlay, and
cause a computing device, in communication with the IS device, to update a field of view (FOV) of a head-mounted display (HMD) coupled thereto and displaying the virtualized object, the FOV being updated based on a determined shape of the 3D protrusion.

17. The system of claim 16, wherein the updated FOV includes another virtualized object that is displayed based on the determined shape.

18. The system of claim 17, wherein the shape is determined based on a contour of the 3D protrusion, the contour being determined based on at least a portion of the generated interaction data received from the IS device.

19. The system of claim 16, wherein the IS device is a touch and hover (TAH) device that is configured to generate interaction data in further response to a user extremity hover-gesture detected over a portion of the 2D interaction-sensing surface.

20. The system of claim 16,
wherein the physical overlay includes a plurality of capacitive couplers that are capacitively coupleable to portions of the 2D interaction-sensing surface when the physical overlay is coupled to the IS device,
wherein the IS device is further configured to generate a one-to-one map between portions of the physical overlay and portions of the 2D interaction-sensing surface, and
wherein the computing device is further configured to update a 3D aspect of the displayed virtualized object based on the received interaction data and the generated one-to-one map.

* * * * *